United States Patent [19]
Ishii et al.

[11] Patent Number: 5,070,402
[45] Date of Patent: Dec. 3, 1991

[54] ENCODING IMAGE INFORMATION TRANSMISSION APPARATUS

[75] Inventors: Yoshiki Ishii, Yokohama; Makoto Shimokoriyama, Kawasaki; Tetsuya Shimizu, Yokoham; Katsuji Yoshimura, Hemamatsu; Akio Fujii; Tomohiko Sasatani, both of Yokohama, all of Japan

[73] Assignee: Canon Kabushiki Kaisha, Tokyo, Japan

[21] Appl. No.: 683,499

[22] Filed: Apr. 10, 1991

Related U.S. Application Data

[63] Continuation of Ser. No. 273,249, Nov. 18, 1988, abandoned.

[30] Foreign Application Priority Data

| Nov. 27, 1987 | [JP] | Japan | 62-267405 |
| Nov. 27, 1987 | [JP] | Japan | 62-297404 |
| Nov. 27, 1987 | [JP] | Japan | 62-297409 |
| Nov. 27, 1987 | [JP] | Japan | 62-297410 |

[51] Int. Cl.$^5$ .............................................. H04N 7/12
[52] U.S. Cl. ................................. 358/135; 358/136; 375/27
[58] Field of Search ............... 358/135, 136, 133, 294, 358/426; 375/27

[56] References Cited

U.S. PATENT DOCUMENTS

| 4,701,807 | 10/1987 | Ogino | 358/286 |
| 4,703,352 | 10/1987 | Kondo | 358/135 |
| 4,722,003 | 1/1988 | Kendo | 358/135 |
| 4,729,021 | 3/1988 | Kondo | 358/135 |
| 4,788,598 | 11/1988 | Ochi et al. | 358/260 |
| 4,823,194 | 4/1989 | Mishima et al. | 358/282 |

FOREIGN PATENT DOCUMENTS 186444 7/1986 European Pat. Off.

OTHER PUBLICATIONS

"Die Blockkompandierung digitaler Fernsehsignale", pp. 1-81 (Dissertation, Institute of Technology, Aachen), by Keesen, 5/22/84.

Primary Examiner—John K. Peng
Attorney, Agent, or Firm—Fitzpatrick, Cella, Harper & Scinto

[57] ABSTRACT

An image information transmission apparatus of this invention encodes and transmits image information. An image information signal of one frame consisting of a plurality of pixel data is divided into a plurality of blocks each consisting of a predetermined number of pixel data. At least two reference value data associated with a dynamic range of levels of the pixel data constituting each of the divided blocks, and distribution state data associated with a distribution state thereof are formed. Each pixel data constituting the block is encoded on the basis of the formed reference value data and the formed distribution state data to obtain encoded data. A transmission data series is formed and transmitted using the formed reference value data, the formed distribution state data, and the encoded data as transmission units. Therefore, the image information signal can be highly effectively transmitted with minimum image quality degradation caused by encoding.

18 Claims, 17 Drawing Sheets

STAGE 0

STAGE 1

STAGE 2

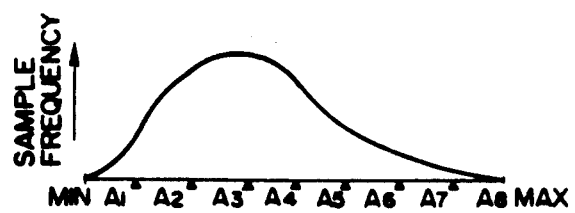
FIG.23(a)
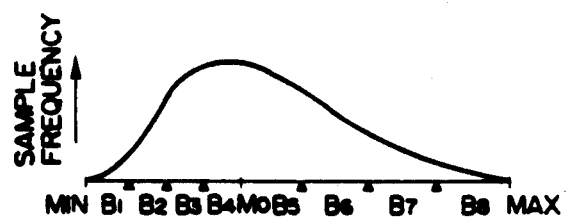
FIG.23(b)
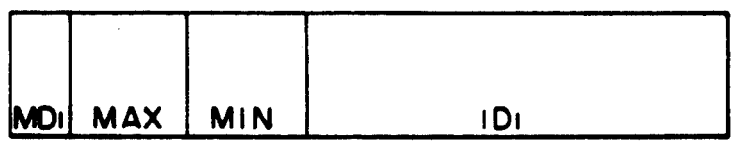
FIG.24(a)
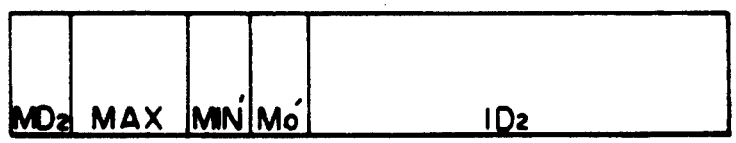
FIG.24(b)
FIG.25
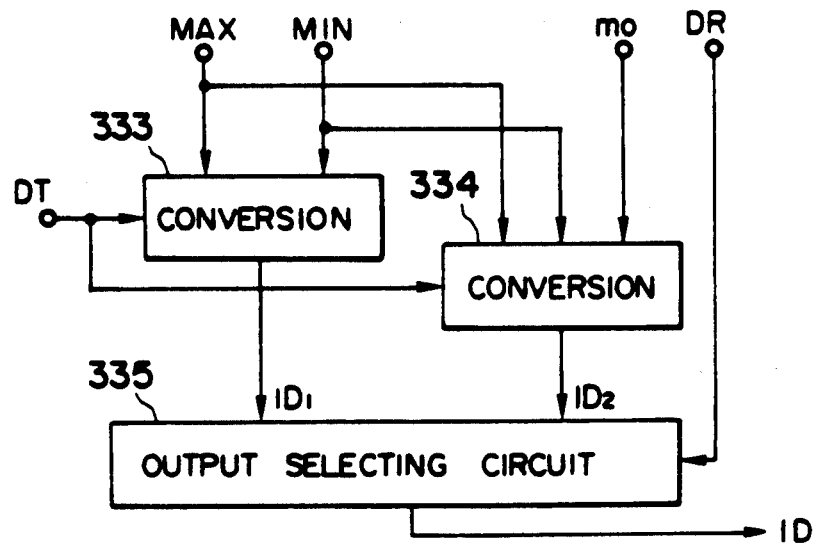

ENCODING IMAGE INFORMATION TRANSMISSION APPARATUS

This application is a continuation of application Ser. No. 273,249, filed Nov. 18, 1988, now abandoned.

BACKGROUND OF THE INVENTION

1. Field of the Invention

The present invention relates to an image information transmission apparatus for transmitting image data as a block code.

2. Related Background Art

A typical conventional encoding scheme for reducing the mean number of bits per sampling frequency or per pixel is known as a method of reducing a transmission band with of a television signal. In the scheme for reducing the mean number of bits per sampling frequency, the image data are interlaced into a half by sampling, and sampling points and a flag, representing positions of sampling points used for interpolation (i.e., a flag representing use of data of upper and lower or right and left sub-sampling points of the interpolation point) are transmitted.

A typical example of the scheme for reducing the mean number of bits per pixel is a block encoding scheme for segmenting a screen of one field into small blocks and encoding is performed in units of blocks (e.g., U.S. Pat. No. 4,703,352). For example, the difference between minimum and maximum values of a block of interest is either linearly or nonlinearly quantized An index representing a quantization level to which each pixel belongs is transmitted, and the minimum and maximum values are transmitted as scale components.

In this block encoding scheme, encoding is performed on the basis of the dynamic range of intrablock pixel values. However, if an extreme contrast difference is present within a block, or a boundary is included in a block, so that a distribution of pixel values is greatly different from that of an assumed state, large distortion occurs in a decoded signal.

SUMMARY OF THE INVENTION

It is an object of the present invention to provide an image information transmission apparatus capable of solving the conventional problems described above.

It is another object of the present invention to provide an information transmission apparatus capable of performing encoding substantially free from image quality degradation and highly efficiently transmitting image information by encoding during transmission of the image information.

In order to achieve the above objects according to an aspect of the present invention, there is provided an image information transmission apparatus capable of encoding and transmitting an image information signal, comprising:

blocking means for receiving an image information signal of one frame consisting of a plurality of pixel data, and for dividing the image information signal into a plurality of blocks each consisting of a predetermined number of pixel data;

first data forming means for forming at least two reference value data associated with a dynamic range of levels of pixel data constituting each of the blocks divided by the blocking means;

second data forming means for forming a distribution state data associated with a distribution state of the levels of the pixel data constituting each of the blocks divided by the blocking means;

encoding means for forming encoded data of the pixel data constituting each block on the basis of the reference value data formed by the first data forming means and the distribution state data formed by the second data forming means; and transmission data series forming means for forming a transmission data series by using the reference value data formed by the first data forming means, the distribution state data formed by the second data forming means, and the encoded data formed by the encoding means as transmission units.

It is still another object of the present invention to provide an image information transmission apparatus capable of adaptively encoding a transmission image in accordance with a state thereof and minimizing information degradation caused by transmission.

In order to achieve the above object according to another aspect of the present invention, there is provided an image information transmission apparatus for encoding and transmitting an image information signal, comprising:

blocking means for receiving an image information signal of one frame consisting of a plurality of pixel data, and for dividing the image information signal into a plurality of blocks each consisting of a predetermined number of pixel data;

first data forming means for forming at least two reference value data associated with a dynamic range of levels of pixel data constituting each of the blocks divided by the blocking means;

second data forming means for forming a distribution state data associated with a distribution state of the levels of the pixel data constituting each of the blocks divided by the blocking means;

encoding means having a first encoding mode for encoding the pixel data constituting each block on the basis of the reference value data formed by the first data forming means and a second encoding mode for encoding the pixel data constituting each block on the basis of the reference value data formed by the first data forming means and the distribution state data formed by the second data forming means, the encoding means being adapted to form encoded data by encoding the pixel data within each block by using one of the first and second encoding modes in accordance with the dynamic range of levels of the pixel data constituting each block; and transmission data series forming means for forming a transmission data series by using the reference value data formed by the first data forming means and the data encoded by the encoding means as transmission units when the pixel data is encoded by the encoding means in the first encoding mode, and for forming a transmission data series by using the reference value data formed by the first data forming means, the distribution state data formed by the second data forming means, and the data encoded by the encoding means as transmission units when the pixel data is encoded by the encoding means in the second encoding mode.

The above and other objects, features, and advantages of the present invention will be apparent from the following detailed description of preferred embodiments in conjunction with the accompanying drawings.

BRIEF DESCRIPTION OF THE DRAWINGS

FIGS. 23(a) and 23(b) are views showing encoding ranges of the encoding apparatus shown in FIG. 22;

FIG. 24 is a view showing output code series from a data series forming circuit 332 shown in FIG. 22;

FIGS. 25(a) and 25(b) are detailed views showing a converter 326 in FIG. 22;

DETAILED DESCRIPTION OF THE PREFERRED EMBODIMENTS

Preferred embodiments of the present invention will be described in detail with reference to the accompanying drawings.

Figure 1:
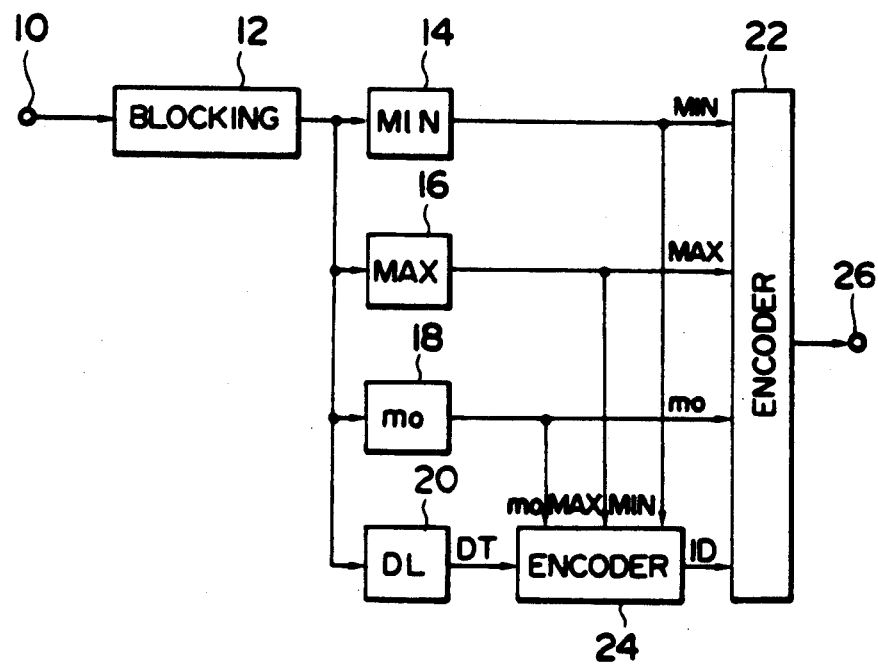
FIG. 1 is a schematic block diagram showing a television signal encoding apparatus which employs the present invention according to a first embodiment of the present invention.

FIG. 1 is a block diagram showing a television signal encoding apparatus according to a first embodiment of the present invention. A digital image signal is input to an input terminal 10. In this embodiment, an NTSC television signal quantized as 8 bits/sample is actually input to the input terminal 10. A blocking circuit 12 receives the signal input from the input terminal 10 in units of horizontal scanning lines, edits the signals in a scanning order in units of horizontal scanning lines, and outputs the edited signal. In this embodiment, one block comprises four samples in the horizontal direction and four lines in the vertical direction. The sample series rearranged by the blocking circuit 12 is input to a minimum value detector (MIN 14, a maximum value detector (MAX) 16, and an intrablock mean value detector ($m_0$) 18, and a delay circuit (DL) 20. An output MIN from the minimum value detector 14, an output MAX from the maximum value detector 16, and an output $m_0$ from the mean value detector 18 are input to encoders 22 and 24.

A sample value DT from the delay circuit 20 is applied to the encoder 24. The encoder 24 generates a 3-bit index ID to the encoder 22. The index ID represents a correspondence of the input sample value and one of the quantization steps defined by the maximum value MAX, the minimum value MIN, and the mean value $m_0$. This will be described in detail later.

Figure 2:
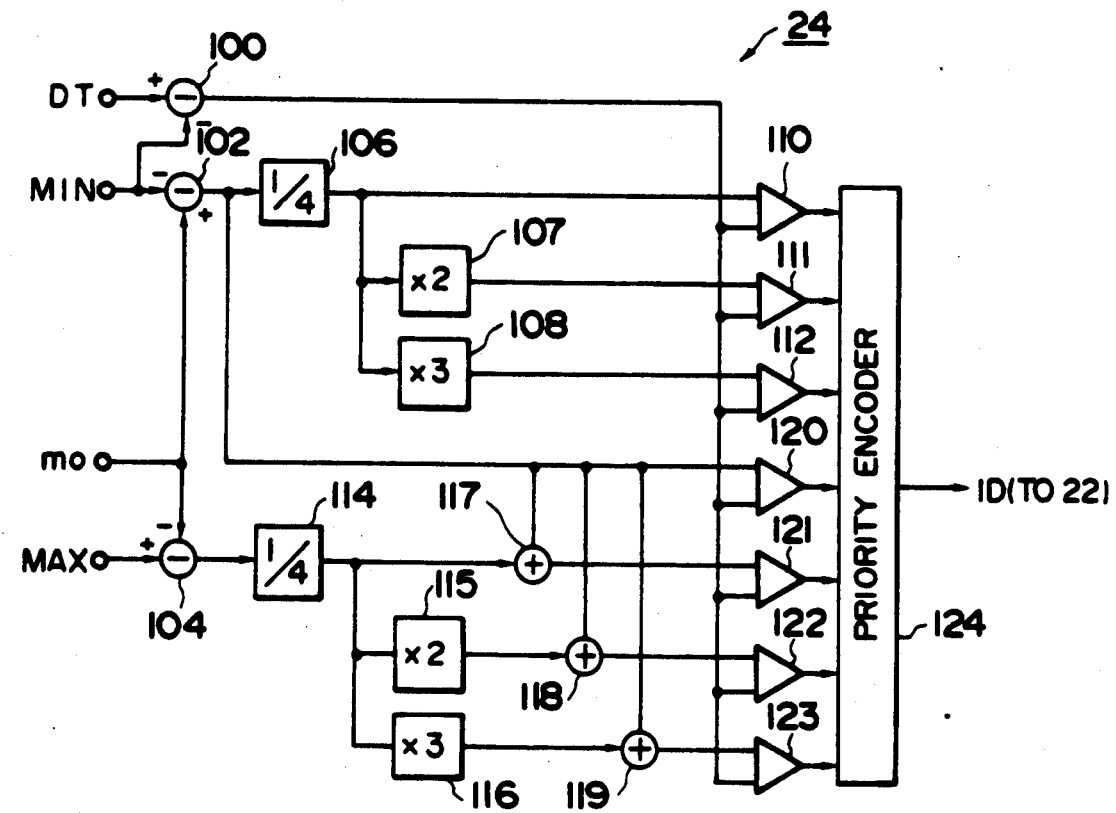
FIG. 2 is a detailed diagram showing an encoder 24 shown in FIG. 1.
Figure 3:
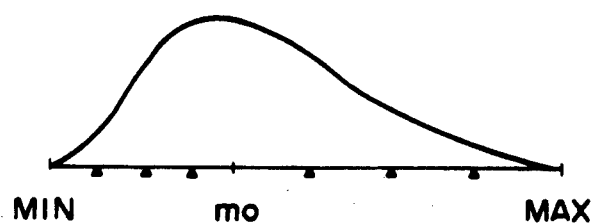
FIG. 3 is a view for explaining a quantization step.

FIG. 2 is a detailed diagram showing the encoder 24. In this embodiment, a difference between the minimum value MIN and the mean value $m_0$ is divided into four areas, and a difference between the mean value $m_0$ and the maximum value MAX is divided into four areas (a total of eight areas). Intrablock sample values DT are assigned to the eight areas, and the 3-bit index ID is output. A subtracter 100 subtracts the minimum value MIN from the sample value DT, a subtracter 102 subtracts the minimum value MIN from the mean value $m_0$, and a subtracter 104 subtracts the mean value $m_0$ from the maximum value MAX. An output ($m_0$−MIN) from the subtracter 102 is supplied to one input of a comparator 120 and is divided into a ¼ value by a divider 106. The ¼ value is supplied to multipliers 107 and 108 and a comparator 110. The multipliers 107 and 108 multiply input signals with 2 and 3, and the multiplied signals are applied to comparators 111 and 112, respectively. An output (MAX−$m_0$) from the subtracter 104 is divided into a ¼ value by a divider 114. The ¼ value is applied to multipliers 115 and 116 and an adder 117. The multipliers 115 and 116 multiply the input signals with 2 and 3, and the multiplied signals are applied to adders 118 and 119, respectively. The output from the subtracter 102 is applied to the adders 117, 118, and 119, and each of the sum signals therefrom is input to one input of a corresponding one of comparators 121, 122, and 123. An output DT' (=DT−MIN) from the subtracter 100 is input to the other input of each of the comparators 110 to 112, and 120 to 123.

If outputs from the comparators 110 to 112 and 120 to 123 are defined as C1 to C7, the outputs C1 to C7 are input to a priority encoder 124 in the following cases:

(1) If $0 \leq DT' < (\frac{1}{4})m_0 - MIN$),
   C1=C2=C3=C4=C5=C6=C7=0

(2) If $(1/4)(m_0-MIN) \leq DT' < (2/4)(m_0-MIN)$, $C1=1$, $C2=C3=C4=C5=C6=C7=0$ (3) If $(2/4)(m_0-MIN) \leq DT' < (3/4)(m_0-MIN)$, $C1=C2=1$, $C3=C4=C5=C6=C7=0$ (4) If $(3/4)(m_0-MIN) \leq DT' < (m_0-MIN)$, $C1=C2=C3=1$, $C4=C5=C6=C7=0$ (5) If $(m_0-MIN) \leq DT' < (1/4)(MAX-m_0)+(m_0-MIN)$, $C1=C2=C3=C4=1$, $C5=C6=C7=0$ (6) If $(1/4)(MAX-m_0)+(m_0-MIN) < DT' < (2/4)(MAX-m_0)+(m_0-MIN)$, $C1=C2=C3=C4=C5=1$, $C6=C7=0$ (7) If $(2/4)(MAX-m_0)+(m_0-MIN) \leq DT' < (3/4)(MAX-m_0)+(m_0-MIN)$, $C1=C2=C3=C4=C5=C6=1$, $C7=0$ (8) If $(3/4)(MAX-m_0)+(m_0-MIN) \leq DT' < (MAX-MIN)$, $C1=C2=C3=C4=C5=C6=C7=1$ More specifically, the priority encoder 124 outputs a 3-bit index ID, i.e., (000) for condition (1), (001) for condition (2), (010) for condition (3), (011) for condition (4), (100) for condition (5), (101) for condition (6), (110) for condition (7), and (111) for condition (8). The output from the priority encoder 124 is applied to the encoder 22.

Figure 4:
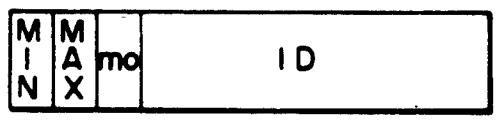
FIG. 4 is a view showing an output code series from an encoder 22 shown in FIG. 1.

The encoder 22 outputs the minimum value MIN, the maximum value MAX the mean value, the index ID of each block as transmission units in a transmission format (FIG. 4) onto a transmission line (not shown) from an output terminal 26.

Figure 5:
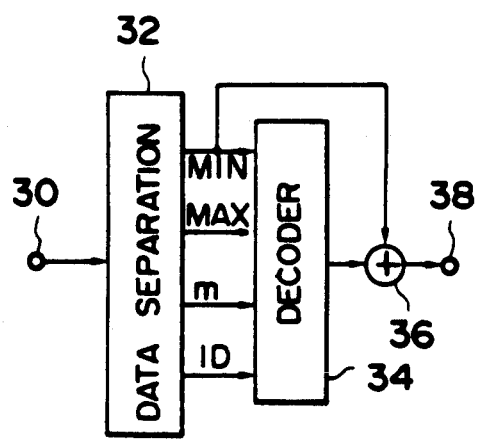
FIG. 5 is a schematic diagram showing a decoding apparatus corresponding to the encoding apparatus shown in FIG. 1.

FIG. 5 is a schematic diagram showing a digital television signal decoding apparatus corresponding to the encoding apparatus shown in FIG. 1. A digital television signal input from a transmission line (not shown) is input to a data separation circuit 32 from an input terminal 30. The data separation circuit 32 separates the additional codes MIN, MAX, and $m_0$ and the coded code ID and supplies separated data to a decoder 34. The decoder 34 outputs a pixel value DT corresponding to a difference between the actual pixel value and the minimum (MIN) level in a block. An adder 36 adds an output from the decoder 34 to the minimum value MIN, and the sum signal appears at an output terminal 38. Therefore, each pixel value appears at the output terminal 38.

Figure 6:
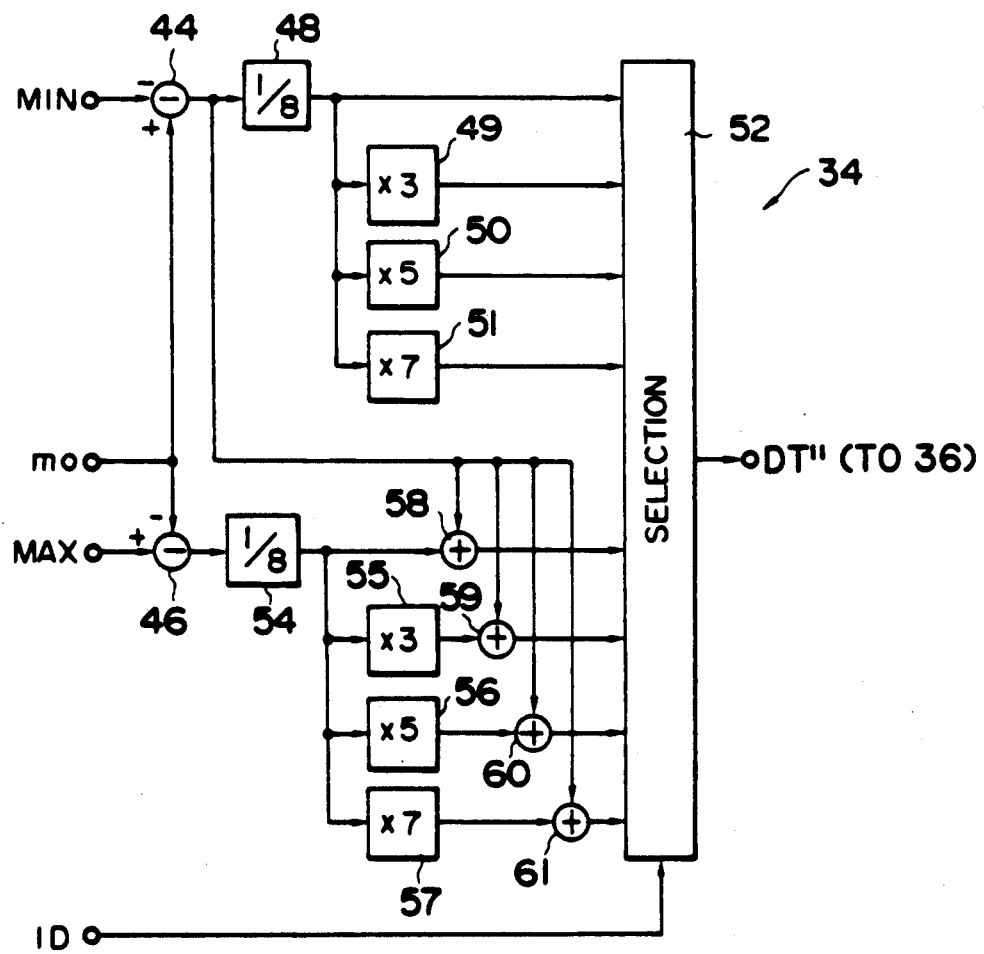
FIG. 6 is a detailed diagram of a decoder 34 shown in FIG. 5.

FIG. 6 is a detailed diagram of the decoder 34. A subtracter 44 calculates a difference between the mean value $m_0$ and the minimum value MIN, and a subtracter 46 calculates a difference between the maximum value MAX and the mean value $m_0$. A divider 48 divides the output $(m_0-MIN)$ from the subtracter 44 by eight, and a quotient output is supplied to multipliers 49, 50, and 51 and a selection circuit 52. The multipliers 49, 50, and 51 multiply the input signals with 3, 5, and 7, and the multiplied signals are supplied to the selection circuit 52. A divider 54 divides the output $(MAX-m_0)$ from the subtracter 46 to produce a $1/8$ value, and the resultant quotient is supplied to multipliers 55, 56, and 57. The multipliers 55, 56, and 57 multiply the input signals with 3, 5, and 7, and the multiplied signals are applied to adders 59, 60, and 61, respectively. The adders 58 to 61 add the outputs from the divider 54 and the multipliers 55 to 57 to the output $(m_0-MIN)$ from the subtracter 44, and the sum signals are supplied to the selection circuit 52. The selection circuit 52 selects and outputs one of the inputs "$(1/8)(m_0-MIN)$", "$(3/8)(m_0-MIN)$", "$(5/8)(m_0-MIN)$", "$(7/8)(m_0-MIN)$", "$(1/8)(MAX-m_0)+(m_0-MIN)$", "$(3/8)(MAX-m_0)+(m_0-MIN)$", "$(5/8)(MAX-m_0)+(m_0-MIN)$", and "$(7/8)(MAX-m_0)+(m_0-MIN)$". The selected output is applied to the adder 36.

According to this embodiment as described above, the digital television signal is encoded in accordance with the distribution of levels of the sample values within the divided block. Even if a volume of information is small, encoding and data transmission can be performed with minimum image degradation.

In this embodiment, when the data MIN, MAX and $m_0$ are transmitted as 8-bit data, respectively, and the data ID is transmitted as 3-bit data, one block (i.e., 16 samples) can be transmitted by 72 bits. As compared with a case wherein each of the 16 samples is transmitted by 8 bits, a high compression ratio of 72/128 can be achieved. In this embodiment, the index ID, and the values MIN, MAX, and $m_0$ are transmitted. However, one of the values MIN and MAX and a dynamic range DR may be transmitted.

In the encoding apparatus of this embodiment, encoding is performed in consideration of the dynamic range and the distribution of the pixels within the block. Therefore, even a pixel block including a boundary of an image can be encoded and transmitted without causing distortion.

Figure 7:
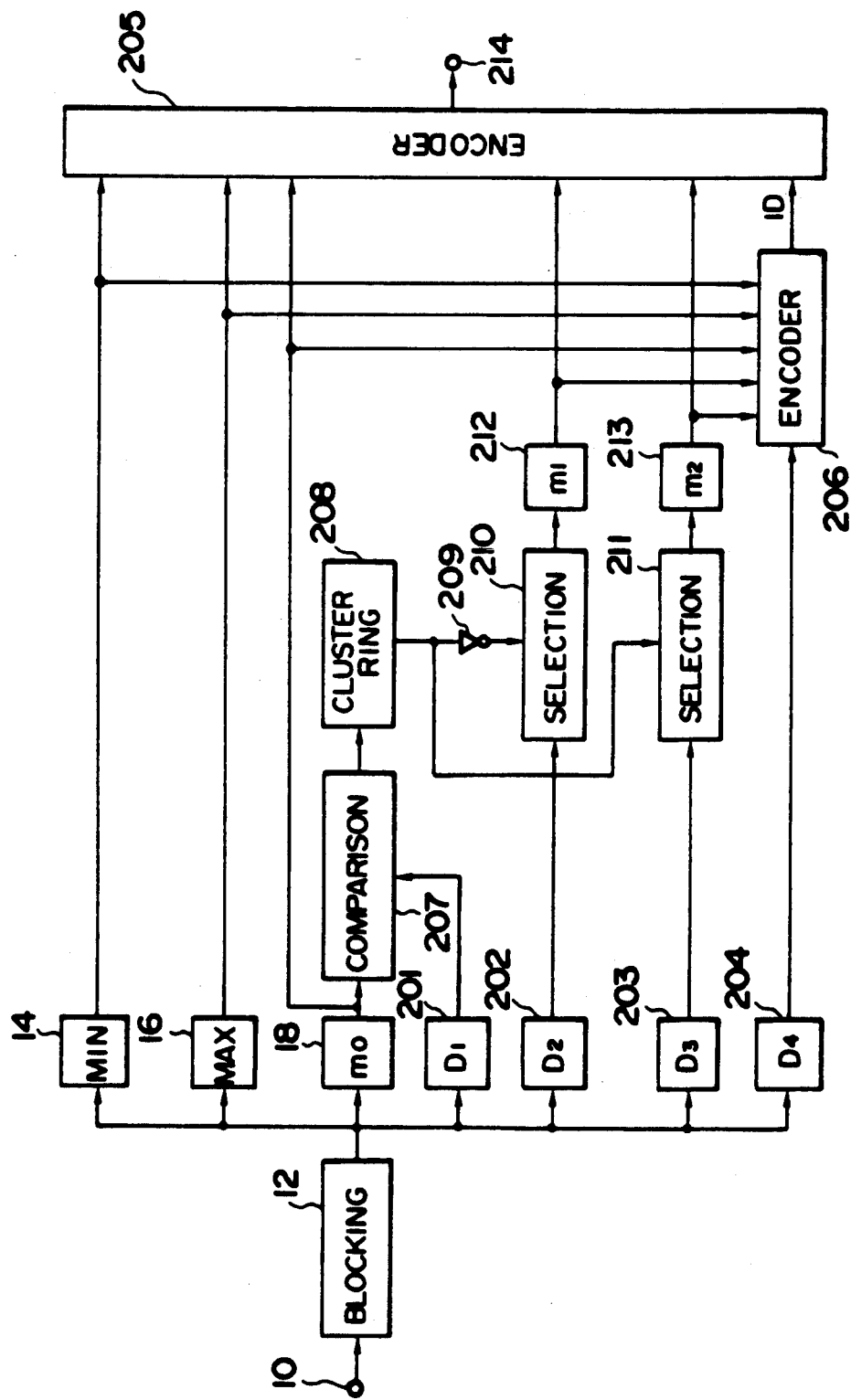
FIG. 7 is a schematic diagram of a television signal encoding apparatus which employs the present invention according to a second embodiment.

FIG. 7 is a block diagram of a television signal encoding apparatus according to a second embodiment of the present invention. The same reference numerals as in FIG. 1 denote the same parts in FIG. 7, and a detailed description thereof will be omitted.

This encoding apparatus includes an input terminal 10 for receiving a digital image signal and a blocking circuit 12. A sample series rearranged by the blocking circuit 12 is applied to a minimum value detector 14, a maximum value detector 16, an intrablock mean value detector 18, and delay circuits 201, 202, 203, and 204. An output MIN from the minimum value detector 14, an output MAX from the maximum value detector 16, an output $m_0$ from the mean value detector 18 are applied to encoders 205 and 206.

A comparator (COMPARISON 207 compares each intrablock sample delayed by the delay circuit 201 with the mean value $m_0$ output from the mean value detector 8. If the delayed sample value is larger than the mean value $m_0$, the comparator 207 outputs a signal of logic "1". Otherwise, the comparator 207 outputs a signal of logic "0". A cluster ring memory 208 has a capacity of 16 bits and stores one-block comparison results from the comparator 207 such that one sample corresponds to one bit. If this bit is set at logic "1", the cluster ring memory 208 outputs a signal of "H" level as a gate pulse to selection circuits 210 and 211. Otherwise, the cluster ring memory 208 outputs a signal of "L" level to the selection circuits 210 and 211. A signal inverted by an inverter 209 is input to the selection circuit 210. That is, of all outputs from the delay circuit 202, the selection circuit 210 gates samples. (subblock 1) having values smaller than the mean value $m_0$. However, of all the outputs from the delay circuit 203, the selection circuit 211 gates samples (subblock 2) having values larger than the mean value $m_0$. A mean value detector 212 detects a mean value $m_1$ of the samples within the subblock 1 and applies a detection signal to encoders 205 and 206. A mean value detector 213 detects a mean value $m_2$ of the samples within the subblock 2 and applies a detection signal to the encoders 205 and 206.

An output DT from the delay circuit 204 is directly applied to the encoder 206. It should be noted that the delay circuits 201 to 204 are connected to adjust timings. The encoder 206 forms a 3-bit index ID (per sample) from the input signals $m_0$, $m_1$, $m_2$, MIN, MAX, and DT. The index ID is applied to the encoder 205. The encoder 205 outputs a code series (to be described later) of each block onto a transmission line (not shown) from an output terminal 214.

Figure 8:
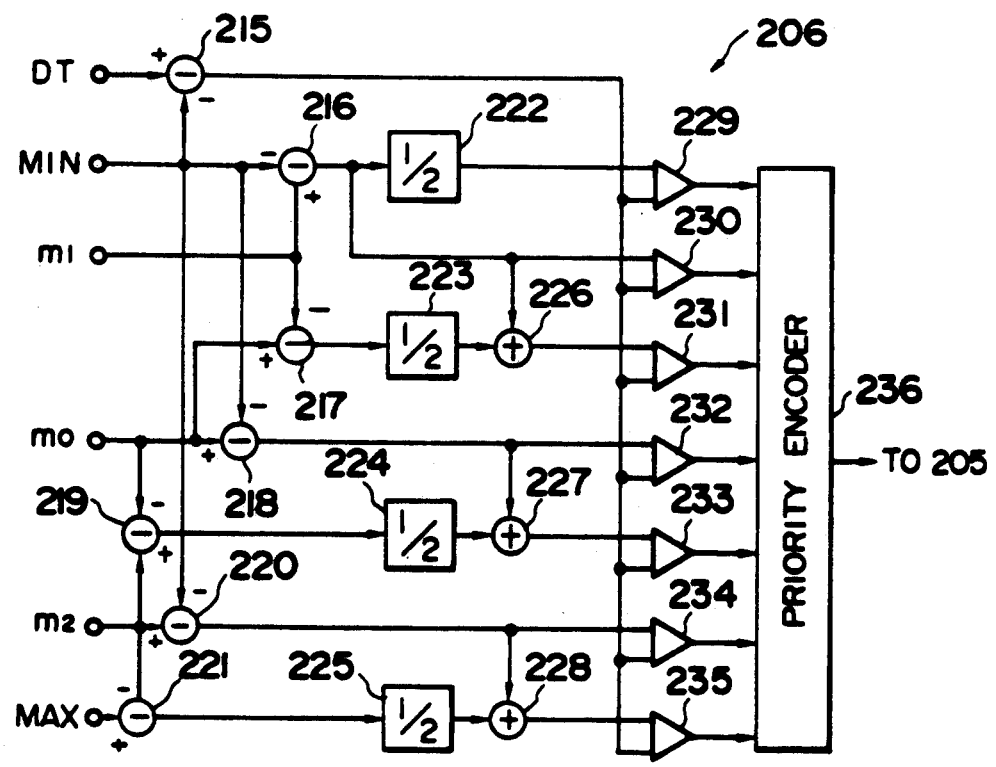
FIG. 8 is a detailed diagram of an encoder 206 shown in FIG. 7.
Figure 11:
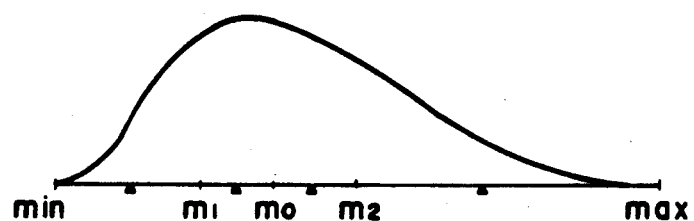
FIG. 11 is a view for explaining a quantization range corresponding to an intrablock pixel distribution.

FIG. 8 is a detailed diagram of the encoder 206. In this embodiment, as shown in FIG. 11, a difference between the minimum value MIN and the mean value $m_1$, a difference between the mean values $m_1$ and $m_0$, a difference between the mean values $m_0$ and $m_2$, and a difference between the mean value $m_2$ and the maximum value MAX are divided into two areas each, thereby encoding the samples with a total of eight areas. Therefore, the index ID can have 3 bits for designating a correspondence between the area and the sample belonging thereto.

Referring to FIG. 8, a subtracter 215 subtracts the minimum value MIN from the sample value DT, a subtracter 216 subtracts the minimum value MIN from the mean value $m_1$, a subtracter 217 subtracts the mean value $m_1$ from the mean value $m_0$, a subtracter 218 subtracts the minimum value MIN from the mean value $m_0$, a subtracter 219 subtracts the mean value $m_0$ from the mean value $m_2$, a subtracter 220 subtracts the minimum value MIN from the mean value $m_2$, and a subtracter 221 subtracts the mean value $m_2$ from the maximum value MAX. Dividers 222, 223, 224, and 225 divide the outputs from the subtracters 216, 217, 219, and 221 into $\frac{1}{2}$ values, respectively. An adder 226 adds an output from the subtracter 216 to an output from the divider 223. An adder 227 adds an output from the subtracter 218 to an output from the divider 224. An adder 228 adds an output from the subtracter 220 to an output from the divider 225. The output $(\frac{1}{2})(m_1-\text{MIN})$ from the divider 222, the output $(m_1-\text{MIN})$ from the subtracter 216, the output $(m_1-\text{MIN})+(\frac{1}{2})(m_0-m_1)$ from the adder 226, the output $(m_0-\text{MIN})$ from the subtracter 218, the output $(m_0-\text{MIN})+(\frac{1}{2})(m_2-m_0)$ from the adder 227, the output $(m_2-\text{MIN})$ from the subtracter 220, and the output $(m_2-\text{MIN})+(\frac{1}{2})(\text{MAX}-m_2)$ from the adder 228 are added to the first input terminals of comparators 229 to 235. An output DT' $(=\text{DT}-\text{MIN})$ is applied to the second input terminals of the comparators 229 to 235.

If outputs from the comparators 229 to 235 are defined as C1 to C7, the outputs C1 to C7 are given as follows:

(1) If $0 \leq \text{DT}' < (\frac{1}{2})(m_1-\text{MIN})$, C1=C2=C3=C4=C5=C6=C7=0

(2) If $(\frac{1}{2})(m_1-\text{MIN}) \leq \text{DR}' < (m_1-\text{MIN})$, C1=1, C2=C3=C4=C5=C6=C7=0

(3) If $(m_1-\text{MIN}) \leq \text{DT}' < (\frac{1}{2})(m_0-m_1)+(m_1-\text{MIN})$, C1=C2=1, C3=C4=C5=C6=C7=0

(4) If $(\frac{1}{2})(m_0-m_1)+(m_1-\text{MIN}) \leq \text{DT}' < (m_0-\text{MIN})$, C1=C2=C3=1, C4=C5=C6=C7=0

(5) If $(m_0-\text{MIN}) \leq \text{DT}' < (\frac{1}{2})(m_2-m_0)+(m_0-\text{MIN})$, C1=C2=C3=C4=1, C5=C6=C7=0

(6) $(\frac{1}{2})(m_2-m_0)+(m_0-\text{MIN}) \leq \text{DT}' < (m_2-\text{MIN})$, C1=C2=C3=C4=C5=1, C6=C7=0

(7) If $(m_2-\text{MIN}) \leq \text{DT}' < (\frac{1}{2})(\text{MAX}-m_2)+(m_2-\text{MIN})$, C1=C2=C3=C4=C5=C6=1, C7=0

(8) If $(\frac{1}{2})(\text{MAX}-m_2)+(m_2-\text{MIN}) \leq \text{DT}' < (\text{MAX}-\text{MIN})$, C1=C2=C3=C4=C5=C6=C7=1

The priority encoder 236 outputs a 3-bit index ID, i.e., (000) for condition (1), (001) for condition (2), (010) for condition (3), (011) for condition (4), (100) for condition (5), (101) for condition (6), (110) for condition (7), and (111) for condition (8). This index ID is applied to the encoder 205.

Figure 12:
FIG. 12 is a view showing an output code series from an encoder 205 in FIG. 7.

As shown in FIG. 12, the encoder 205 outputs the data MIN, MAX, $m_1$, $m_0$, $m_2$, and ID as units of each block to an output terminal 214. In this embodiment as described above, the values MIN, MAX, $m_1$, $m_0$, and $m_2$ are given as 8-bit data, respectively, and the index ID is given as 3-bit data per sample. As compared with a case wherein all sample values are transmitted as 8-bit data, a higher compression ratio of 88/128 can be obtained.

Figure 9:
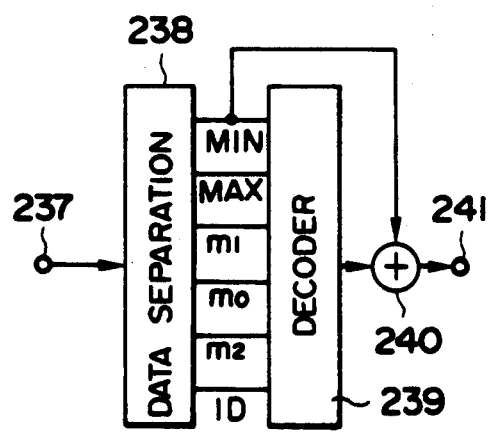
FIG. 9 is a schematic diagram of a decoding apparatus corresponding to the encoding apparatus shown in FIG. 7.

FIG. 9 is a schematic diagram of a decoding apparatus corresponding to the encoding apparatus shown in FIG. 7. A digital television signal input from a transmission line (not shown) is input to a data separation circuit 238 through an input terminal 237 and is separated into the data MIN, MAX, $m_0$, $m_1$, $m_2$, and ID. These data are supplied to a decoder 239. An output from the decoder 239 represents a value corresponding to a difference between the actual pixel value and the MIN level within the block. The output from the decoder 239 is added to the minimum value MIN by an adder 240 so as to compensate for the MIN level. A sum signal from the adder 240 is output to an output terminal 241. Each pixel value appears at the output terminal 241.

Figure 10:
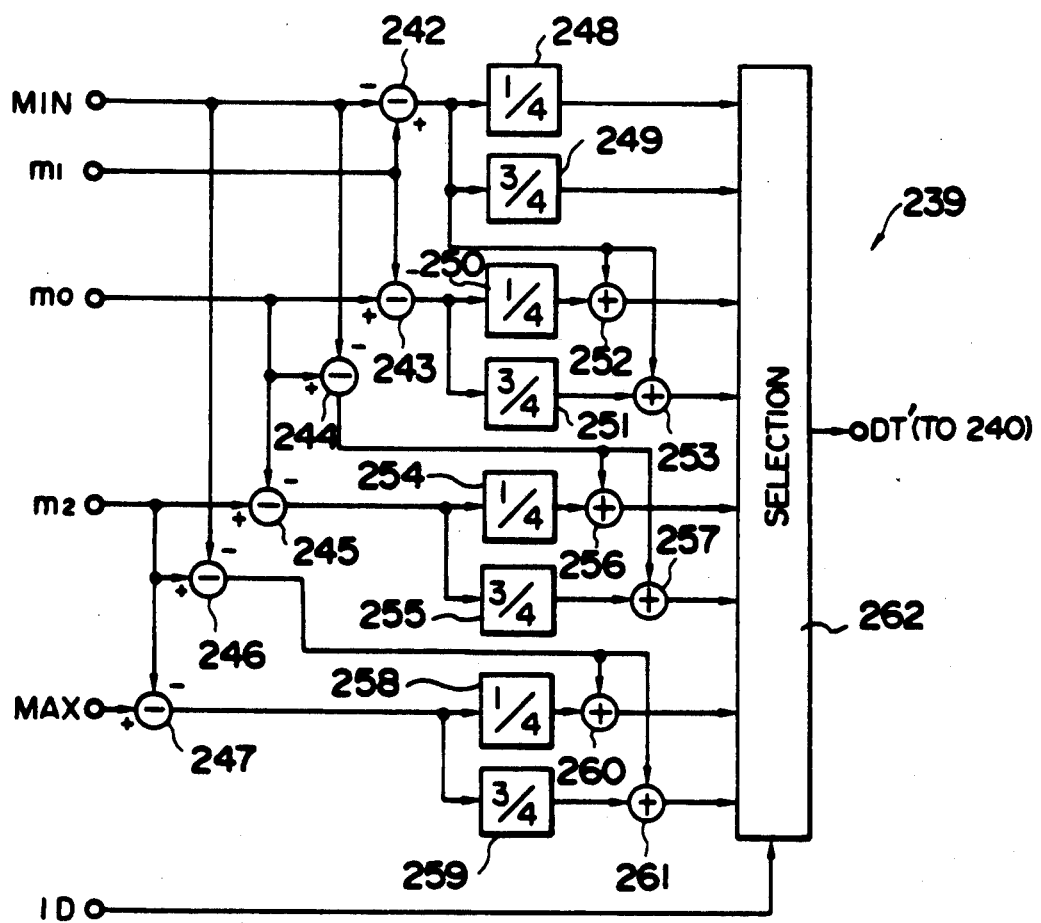
FIG. 10 is a detailed diagram of a decoder 239 shown in FIG. 9.

FIG. 10 is a detailed diagram of the decoder 239 shown in FIG. 9. A subtracter 242 subtracts the minimum value MIN from the mean value $m_1$, a subtracter 243 subtracts the mean value $m_1$ from the mean value $m_0$, a subtracter 244 subtracts the minimum value MIN from the mean value $m_0$, a subtracter 245 subtracts the mean value $m_0$ from the mean value $m_2$, a subtracter 246 subtracts the minimum value MIN from the mean value $m_2$, and a subtracter 247 subtracts the mean value $m_2$ from the maximum value MAX. A divider 248 divides the output $(m_1-\text{MIN})$ from the subtracter 242 to obtain a $\frac{1}{4}$ value, and a divider 249 divides the output $(m_1-\text{MIN})$ to obtain a $\frac{3}{4}$ value. Dividers 250 and 251 divide the output $(m_0-m_1)$ from the subtracter 243 to obtain $\frac{1}{4}$ and $\frac{3}{4}$ values, respectively. An adder 252 adds an output from the subtracter 242 to an output from the divider 250. An adder 253 adds an output from the subtracter 242 to an output from the divider 251. A divider 254 divides an output $(m_2-m_0)$ from the subtracter 245 to obtain a $\frac{1}{4}$ value, and a divider 255 divides this output to obtain a $\frac{3}{4}$ value. An adder 256 adds the output $(m_0-\text{MIN})$ from the subtracter 244 to an output from the divider 254. An adder 257 adds an output from the subtracter 244 to an output from the divider 255. A divider 258 divides an output $(\text{MAX}-m_2)$ from the subtracter 247 to obtain a $\frac{1}{4}$ value, and a divider 259 divides this output to obtain a $\frac{3}{4}$ value. An adder 260 adds an output $(m_2-\text{MIN})$ from the subtracter 246 to an output from the divider 258. An adder 261 adds an output from the subtracter 246 to an output from the divider 259.

A selection circuit 262 selects any one of the outputs from the dividers 248 and 249 and the adders 252, 253, 256, and 257 in accordance with the index ID. More specifically, the output from the selection circuit 262 is one of the inputs "$(\frac{1}{4})(m_1-\text{MIN})$", "$(\frac{3}{4})(m_1-\text{MIN})$", "$(\frac{1}{4})(m_0-m_1)+(m_1-\text{MIN})$", "$(\frac{3}{4})(m_0-m_1)+(m_0-\text{MIN})$", "$(\frac{1}{4})(m_2-m_0)+(m_0-\text{MIN})$", "$(\frac{3}{4})(m_2-m_0)+(m_0-\text{MIN})$", $(\frac{1}{4})(\text{MAX}-m_2)+(m_2-\text{MIN})$", and "$(\frac{3}{4})(\text{MAX}-m_2)+(m_2-\text{MIN})$". This output is applied to the adder 240 in FIG. 9.

According to this embodiment as described above, the digital television signal is encoded and transmitted in accordance with the distribution of levels of the sample values within the divided block. Therefore, even if a volume of information is small, encoding and transmission can be achieved with minimum image quality degradation.

In this embodiment, the index ID and the data MIN, MAX, $m_0$, $m_1$, and $m_2$ are transmitted. However, one of the values MIN and MAX and a dynamic range DR may be transmitted. The number of mean values $m_0$, $m_1$, and $m_2$ is not limited to three. The mean values $m_0$, $m_1$, and $m_2$ may be determined on the basis of a histogram of intrablock sample values.

According to the encoding apparatus of this embodiment, encoding is performed in consideration of the dynamic range and the distribution of the intrablock pixels. Therefore, even a pixel block including a boundary of an image can be transmitted without distortion.

Figure 13:
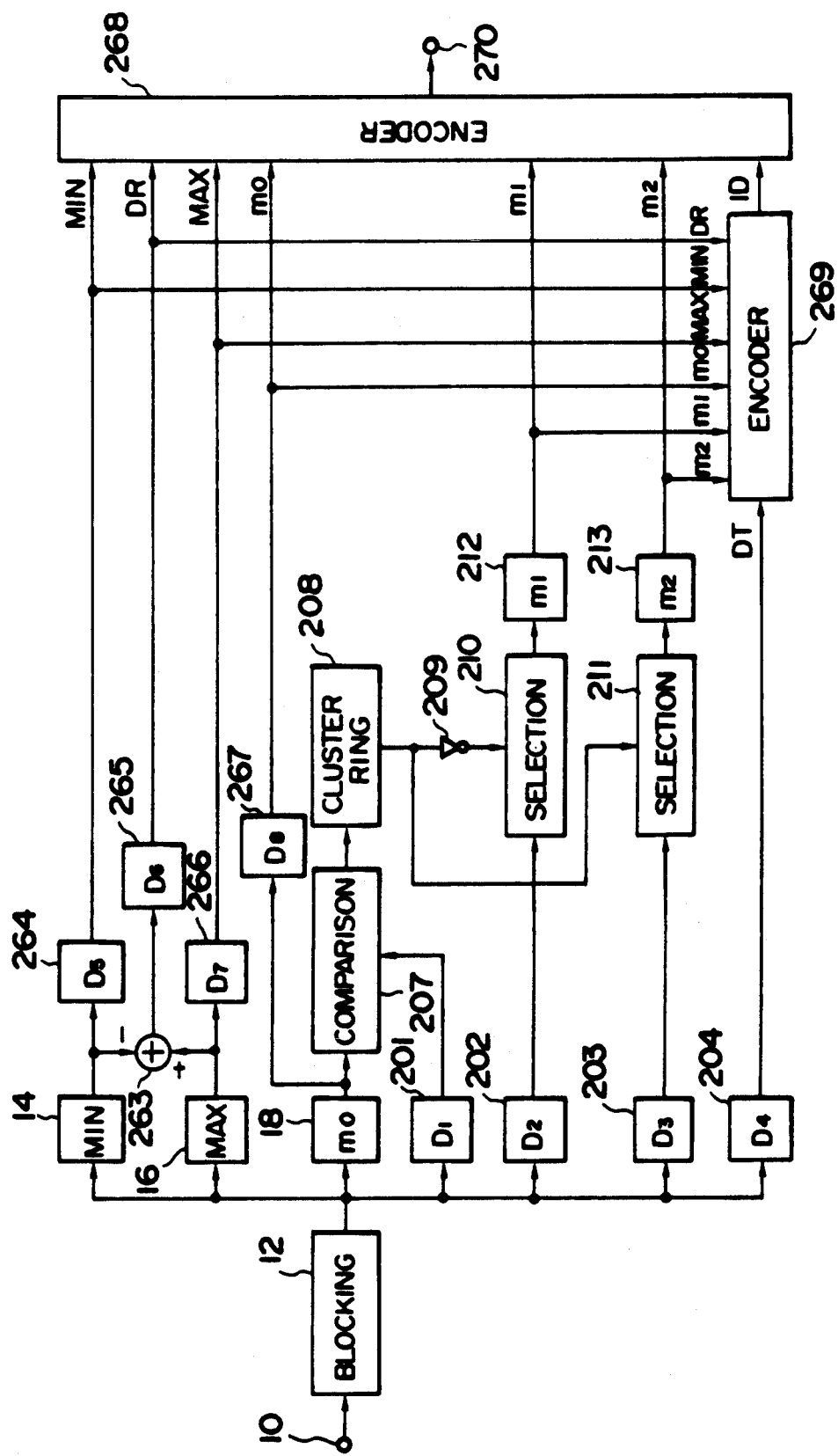
FIG. 13 is a schematic diagram of a television signal encoding apparatus which employs the present invention according to a third embodiment.

FIG. 13 is a block diagram of a television signal encoding apparatus according to a third embodiment of the present invention.

The same reference numerals as in FIGS. 1 and 7 denote the same parts in FIG. 13, and a detailed description thereof will be omitted.

Referring to FIG. 13, the encoding apparatus includes an input terminal 10 for receiving a digital image signal and a blocking circuit 12.

A sample series rearranged by the blocking circuit 12 is applied to a minimum value detector 14, a maximum value detector 16, an intrablock mean value detector 18, and delay circuits 201, 202, 203, and 204. A subtracter 263 calculates a difference between a maximum value MAX detected by the maximum value detector 16 and a minimum value MIN detected by the minimum value detector 14. An output MIN from the minimum value detector 14, an output DR (=MAX−MIN) from the subtracter 263, an output MAX from the maximum value detector 16, and an output $m_0$ from the mean value detector 18 are applied to encoders 268 and 269 through delay circuits 264, 265, 266, and 267.

In the same manner as in the encoding apparatus shown in FIG. 7, a mean value $m_1$ of samples within a subblock 1 is applied from a mean value detector 48 to the encoders 268 and 269. A mean value $m_2$ of samples within a subblock 2 is applied from a mean value detector 50 to the encoders 268 and 269.

An output DT from the delay circuit 204 is directly applied to the encoder 269. It should be noted that the delay circuits 201 to 204 and the delay circuits 264 to 267 are connected to adjust timings. The encoder 269 generates an index ID (3 bits/sample) from the input signals $m_0$, $m_1$, $m_2$, MIN, MAX, DR, and DT. The 3-bit index ID is applied to the encoder 268. The encoder 268 outputs a code (to be described later) to a transmission line (not shown) from an output terminal 270.

Figure 14:
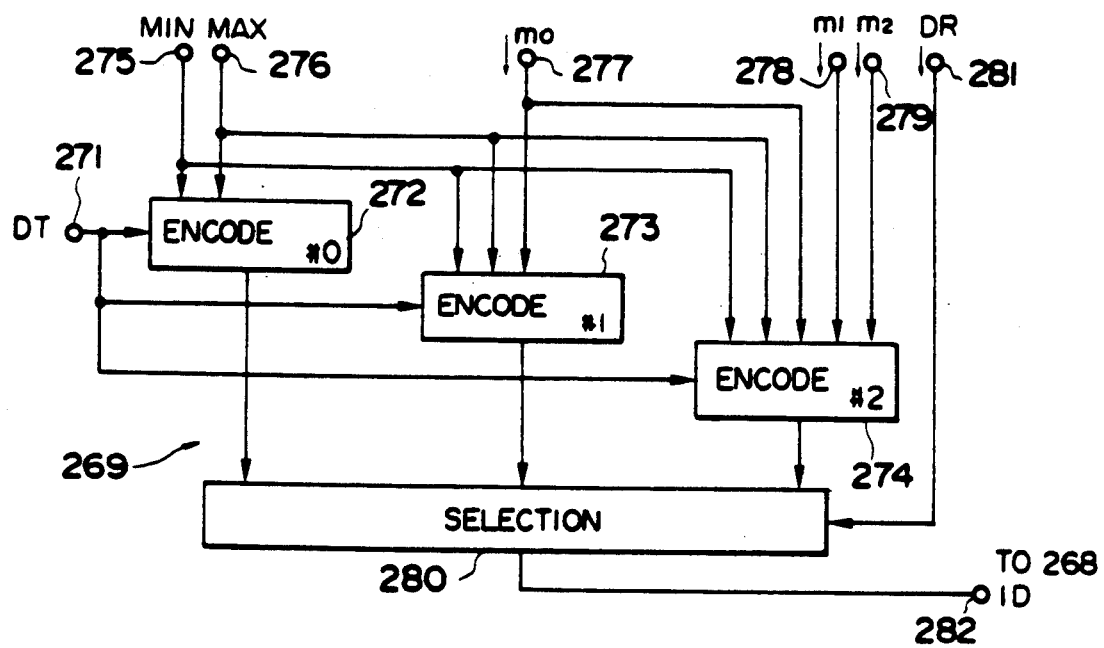
FIG. 14 is a detailed diagram of an encoder 269 shown in FIG. 13.
Figure 15A:
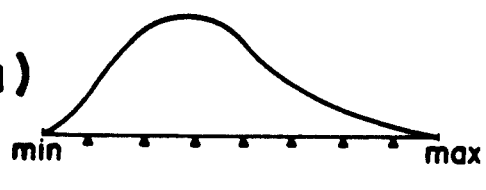
FIGS. 15(a) to 15(c) are views showing encoding ranges of the encoding apparatus shown in FIG. 13.
Figure 15B:
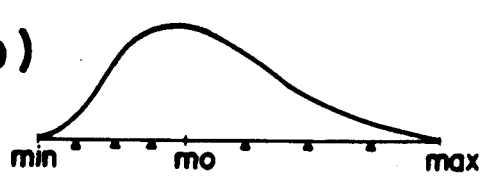
Figure 15C:
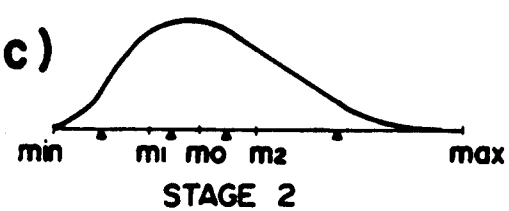

FIG. 14 is a detailed diagram of the encoder 269. The sample value DT input from an input terminal 271 is applied to encoders 272, 273, and 274. The data MIN and MAX input from input terminals 275 and 276 are applied to encoding elements (ENCODE) 272, 273, and 274. The data $m_0$ input from an input terminal 277 is applied to encoding elements 273 and 274, and the data $m_1$ and $m_2$ input from input terminals 278 and 279 are applied to an encoding element 274. In this embodiment, the encoding element 272 encodes the data DT in an operating mode (stage 0) for dividing the dynamic range into eight areas at equal intervals. The encoding element 273 encodes the data DT in an operating mode (stage 1) for dividing the difference between the values $m_0$ and MAX into four areas (a total of eight areas). The encoding element 274 encodes the data DT in an operating mode (stage 2) for dividing the different between the values MIN and $m_1$ into two areas, the difference between the values $m_1$ and $m_0$ into two areas, and the difference between the values $m_0$ and $m_2$ into two areas (a total of eight areas). The divided areas in stages 0, 1, and 2 are shown in FIGS. 15(a) to 15(c), respectively. Each of the encoding elements 272, 273, and 274 outputs the index ID (3bits/sample).

A selection circuit 280 compares the dynamic range DR of the sample value within each block with predetermined threshold values TH1 and TH2 (TH1<TH2). If condition DR<TH1 is established, the selection circuit 280 selects an output from the encoding element 272; if TH1≦DR<TH2, an output from the encoding element 273; and if TH2≦DR, an output from the encoding element 274. The index ID selected by the selection circuit 280 is supplied to the encoder 268 (FIG. 13) through an output terminal 282.

Figure 16:
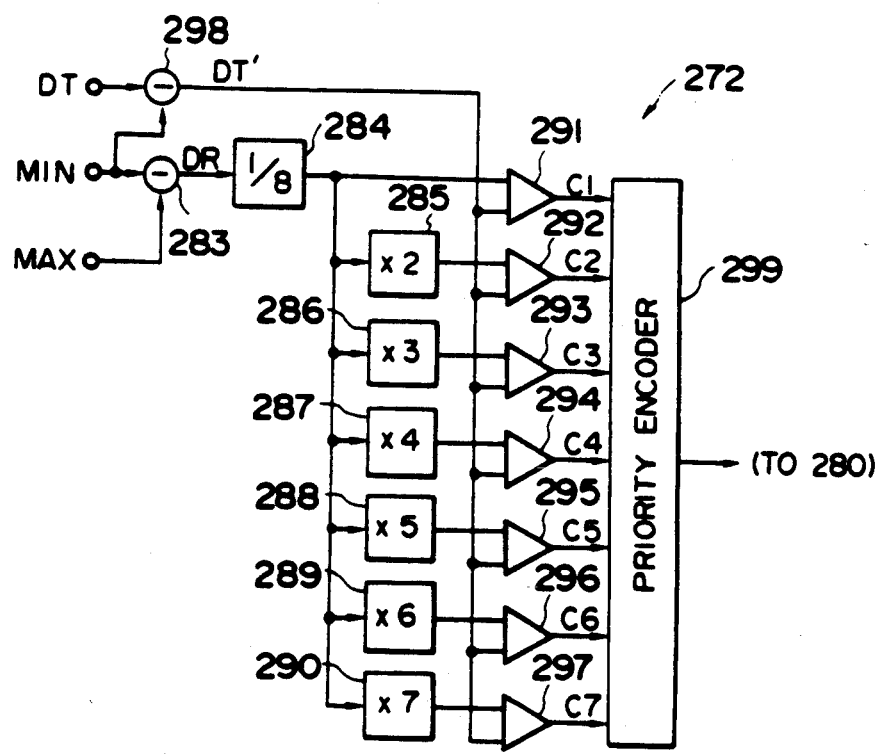
FIG. 16 is a detailed diagram showing an encoding element 272 shown in FIG. 14.

FIG. 16 is a detailed diagram of the encoding element 272 shown in FIG. 14. A subtracter 283 subtracts the minimum value MIN from the maximum value MAX and outputs a signal representing the dynamic range DR. The dynamic range signal is divided by a divider to obtain a ⅛ value thereof. This ⅛ value is supplied to a comparator 291 directly and to comparators 291 to 297 through multipliers 285 to 290. The multipliers 285 to 290 multiply the input signals with 2, 3, ..., 7. A subtracter 298 subtracts the minimum value MIN from the sample value DT within the block, and the difference output DT' is applied to the comparators 291 to 297. Comparison outputs C1 to C7 from the comparators 291 to 297 are supplied to a priority encoder 299. The outputs C1 to C7 are given in accordance with the output DT' from a subtracter 298:

(1) If $0 \leq DT' < (⅛)DR$, C1=C2=C3=C4=C5=C6=C7=0
(2) If $(⅛)DR \leq DT' < (2/8)DR$, C1=1, C2=C3=C4=C5=C6=C7=0
(3) If $(2/8)DR \leq DT' < (⅜)DR$, C1=C2=1, C3=C4=C5=C6=C7=0
(4) If $(⅜)DR \leq DT' < (4/8)DR$, C1=C2=C3=1, C4=C5=C6=C7=0
(5) If $(4/8)DR \leq DT' < (5/8)DR$, C1=C2=C3=C4=1, C5=C6=C7=0
(6) If $(5/8)DR \leq DT' < (6/8)DR$, C1=C2=C3=C4=C5=1, C6=C7=0
(7) If $(6/8)DR \leq DT' < (7/8)DR$, C1=C2=C3=C4=C5=C6=1, C7=0
(8) If $(⅞)DR \leq DT' < DR$, C1=C2=C3=C4=C5=C6=C7=1

The priority encoder 299 outputs a 3-bit code, i.e., (000) for condition (1), (001) for condition (2), (010) for condition (3), (011) for condition (4), (100) for condition (5), (101) for condition (6), (110) for condition (7), and (111) for condition (8). This output is applied to the selection circuit 280 (FIG. 14).

The coding element 273 shown in FIG. 14 has the same arrangement as the encoder 24 shown in FIG. 2. In this embodiment, the priority encoder 124 shown in FIG. 2 outputs the 3-bit index ID in the same manner as in the encoding element 272. The output is applied to the selection circuit 280 in FIG. 14.

The encoding element 274 shown in FIG. 14 has the same arrangement as that of the encoder 206 shown in FIG. 8. In this embodiment, the priority encoder 236 shown in FIG. 8 outputs the 3-bit index ID in the same manner as in the coding element 273. The output is applied to the selection circuit 280 shown in FIG. 14.

Figure 17:
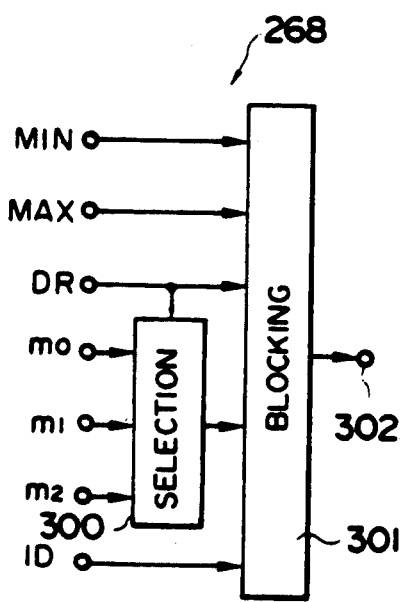
FIG. 17 is a detailed diagram of an encoder 268 shown in FIG. 13.
Figure 18A:
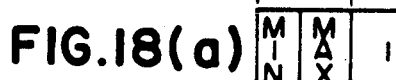
FIGS. 18(a) to 18(c) are views showing output code series from the encoder 268 in FIG. 13.
Figure 18B:
Figure 18C:
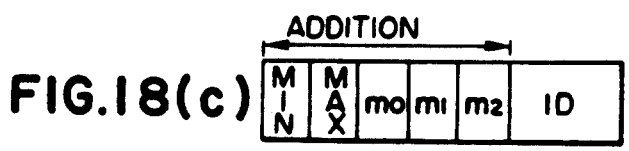

FIG. 17 is a detailed diagram showing an arrangement of the encoder 268 shown in FIG. 13. A selection circuit 300 does not generate any output if $DR < TH1$ (stage 0), and outputs $m_0$ if $TH1 \leq DR < TH2$ (stage 1), and $m_0$, $m_1$, and $m_2$ $TH2 \leq DR$ (stage 2) in accordance with the relationship between the dynamic range DR and the predetermined threshold values TH1 and TH2. In stage 0, a blocking circuit 301 outputs each input code series as a serial code series shown in FIG. 18(a) onto a transmission line (not shown). In stage 1, the blocking circuit 301 outputs each input code series as a serial code series shown in FIG. 18(b). In stage 2, the blocking circuit 301 outputs each input code series as a serial code series shown in FIG. 18(c).

Figure 19:
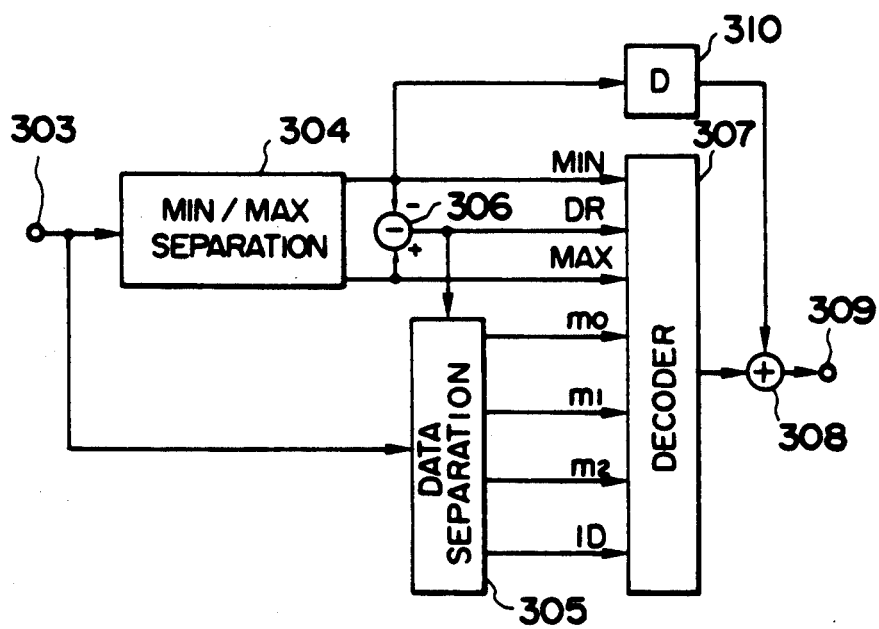
FIG. 19 is a schematic diagram of a decoder corresponding to the encoding apparatus shown in FIG. 13.

FIG. 19 is a schematic diagram of a digital television signal decoding apparatus corresponding to the encoding apparatus of FIG. 13 according to the present invention. A digital television signal input from a transmission line (not shown) is applied from an input terminal 303 to a MIN/MAX separation circuit 304 and a data separation circuit 305. The MIN/MAX separation circuit 304 separates the additional codes MIN and MAX from the input code series. A subtracter 306 calculates a difference DR ($=$MAX$-$MIN) between the separated codes MIN and MAX. The difference DR is applied to a decoder 307 and the data separation circuit 305. The data separation circuit 305 separates the data $m_0$, $m_1$, $m_2$, and ID from the input code series in accordance with the difference DR. The separated data are supplied to the decoder 307. The decoder 307 also receives the codes MAX and MIN from the MIN/MAX separation circuit 304. An output from the decoder 307 is obtained by removing the MIN level (to be described later). The output from the decoder 307 is added to the code MIN by an adder 308. Therefore, a decoded digital television signal appears at an output terminal 309. A delay circuit 310 serves as a time adjusting circuit.

Figure 20:
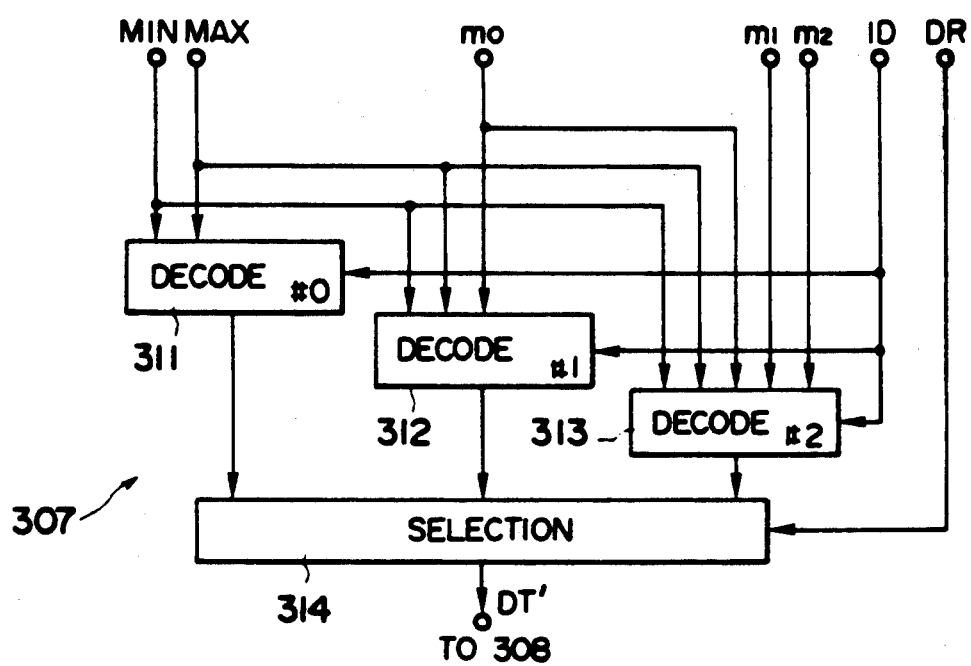
FIG. 20 is a detailed diagram of a decoder 307 shown in FIG. 19.

FIG. 20 is a detailed diagram of the decoder 307 shown in FIG. 19. The decoder 307 includes a decoding element (DECODE) 311 for stage 0, a decoding element 312 for stage 1, and a decoding element 313 for stage 2. The data MIN, MAX, and ID are applied to the decoding element 311, the data MIN, MAX, ID, and $m_0$ are applied to the decoding element 312, and the data MIN, MAX, ID, $m_0$, $m_1$, and $m_2$ are applied to the decoding element 313. A selection circuit 314 selects one of the outputs from the decoding elements 311, 312, and 313 in accordance with the difference DR and the predetermined threshold values TH1 and TH2 (TH1$<$TH2). This output is supplied to the adder 308 shown in FIG. 19.

Figure 21:
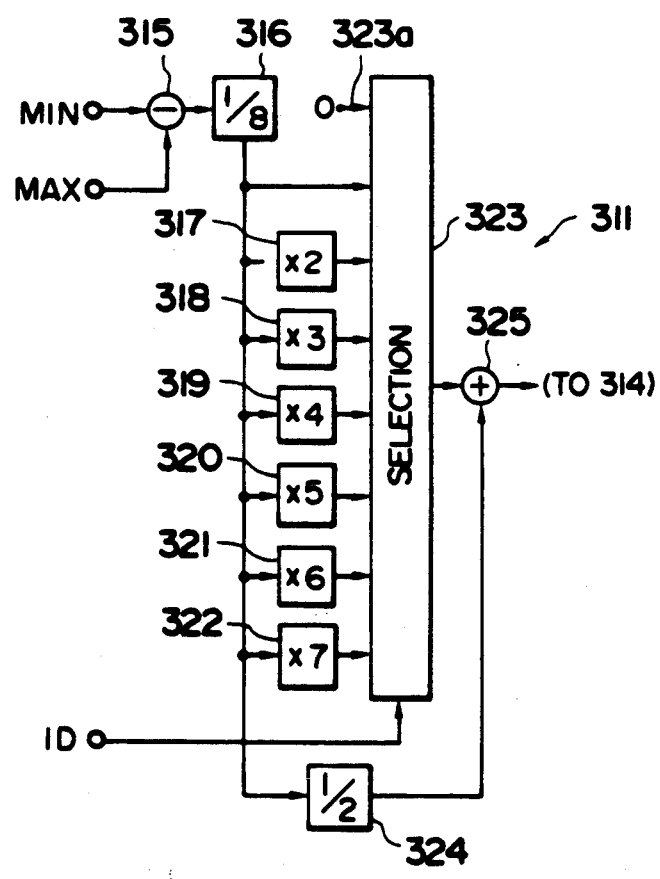
FIG. 21 is a detailed diagram showing a decoding element 311 shown in FIG. 20.

FIG. 21 is a detailed diagram of the decoding element 311 for stage 0. A subtracter 315 calculates a difference DR ($=$MAX$-$MIN) from the codes MIN and MAX, and the difference DR is supplied to a divider 316. The divider 316 divides the input to obtain a $\frac{1}{8}$ value which is then applied to multipliers 317 to 322 and a selection circuit 323. The multipliers 317 to 322 multiply the input signals with 2, 3, 4, 5, 6, and 7, and the multiplied signals are applied to the selection circuit 323. Therefore, the selection circuit 323 receives each boundary value obtained by dividing the difference or dynamic range DR into eight areas. A selection circuit 323 also receives "0" from a terminal 323a. The selection circuit 323 selects one of "0", "($\frac{1}{8}$)DR", "(2/8)DR", "($\frac{3}{8}$)DR", "(4/8)DR", "($\frac{5}{8}$)DR", "(6/8)DR", and "($\frac{7}{8}$)DR" in accordance with the index ID. A divider 324 and an adder 325 are used to set a representative value. The divider 324 divides the output from the divider 316 to obtain a $\frac{1}{2}$ value. The adder 325 adds the output selected by the selection circuit 323 to the output from the divider 324. An output from the adder 325 is supplied to the selection circuit 314 (FIG. 20).

The decoding element 312 for stage 1 shown in FIG. 20 has the same arrangement as that of the decoder 34 shown in FIG. 6. In this embodiment, the selection circuit 52 selects and outputs one of the inputs "($\frac{1}{8}$)($m_0-$MIN)", "($\frac{3}{8}$)($m_0-$MIN)", "($\frac{5}{8}$)($m_0-$MIN)", "($\frac{7}{8}$)($m_0-$MIN)", "($\frac{1}{8}$)(MAX$-m_0$)$+$($m_0-$MIN)", "($\frac{3}{8}$)(MAX$-m_0$)$+$($m_0-$MIN)", "($\frac{5}{8}$)(MAX$-m_0$)$+$($m_0-$MIN)", and "($\frac{7}{8}$)(MAX$-m_0$)$+$($m_0-$MIN)". The selected output is applied to the selection circuit 314 (FIG. 20).

The decoding element 313 for stage 2 shown in FIG. 20 has the same arrangement as that of the decoder 239 shown in FIG. 10. In this embodiment, the selection circuit 262 of FIG. 10 selects and outputs one of the inputs "($\frac{1}{8}$)($m_1-$MIN)", "($\frac{3}{8}$)($m_1-$MIN)", "($\frac{1}{8}$)($m_0-m_1$)$+$($m_1-$MIN)", "($\frac{3}{8}$)($m_0-m_1$)$+$($m_1-$MIN)", "($\frac{1}{8}$)($m_2-m_0$)$+$($m_0-$MIN)", "($\frac{3}{8}$)($m_2-m_0$)$+$($m_0-$MIN)", "($\frac{1}{8}$)(MAX$-m_2$)$+$($m_2-$MIN)", and "($\frac{3}{8}$)(MAX$-m_2$)$+$($m_2-$MIN)". The selected output is applied to the selection circuit 314 (FIG. 20).

According to this embodiment as described above, an appropriate operating mode is selected in accordance with a distribution of levels of sample values within each divided block, and the digital television signal is encoded and transmitted on the basis of the operating mode. Even if a volume of information is small, encoding and transmission can be performed with minimum image quality degradation. The operating mode of the transmitted data train can be accurately detected. Therefore, the original television signal can be appropriately encoded.

In this embodiment, the index ID and the values MIN, MAX, $m_0$, $m_1$, and $m_2$ are transmitted. However, one of the values MIN and MAX and the dynamic range DR may be transmitted. The number of mean values is not limited to three, i.e., $m_0$, $m_1$, and $m_2$. In addition, the mean values $m_0$, $m_1$, and $m_2$ may be determined on the basis of a histogram of sample values of each block.

According to this embodiment, an optimal encoding method is selected in consideration of the distribution of pixels within each block, and encoding is performed. Therefore, image quality degradation caused by encoding can be reduced during transmission.

Figure 22:
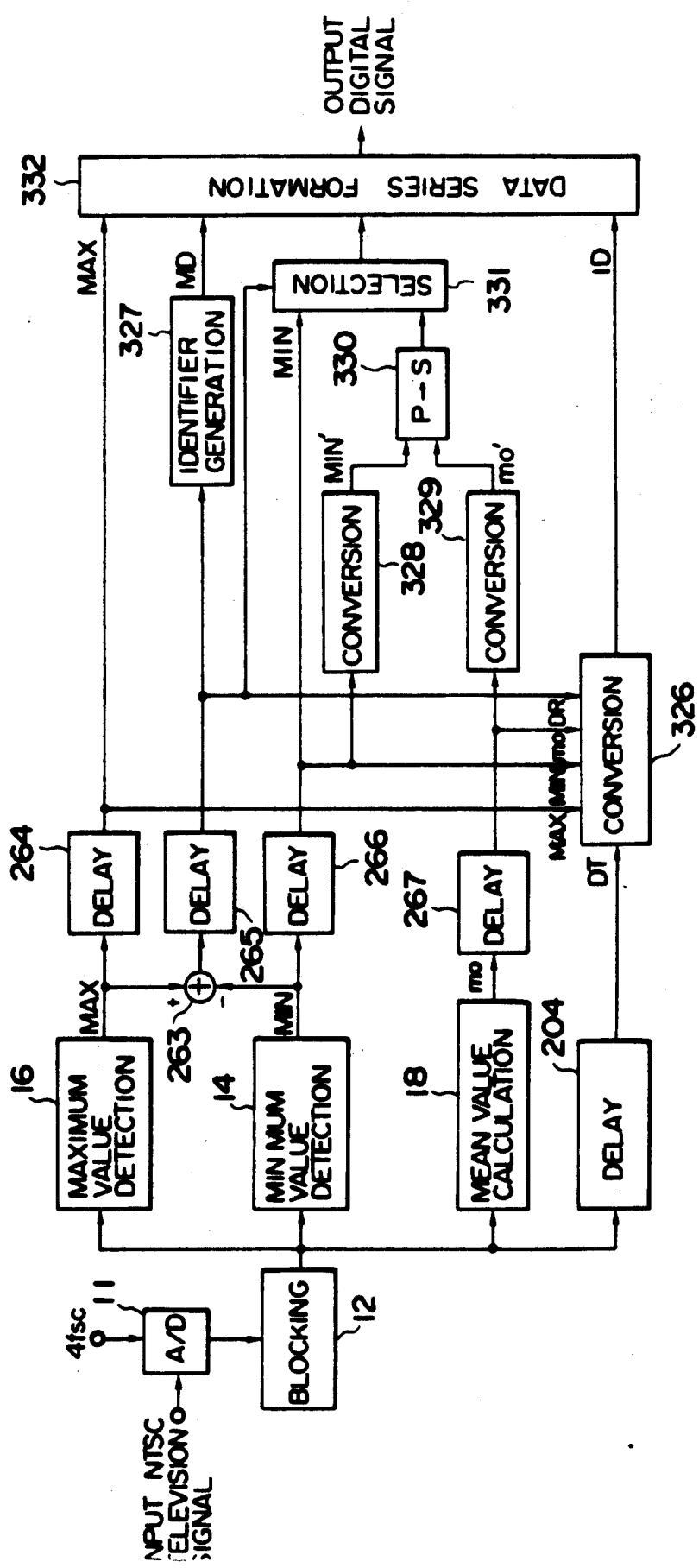
FIG. 22 is a schematic diagram showing a television signal encoding apparatus which employs the present invention according to a fourth embodiment.

FIG. 22 is a block diagram of a television signal encoding apparatus according to a fourth embodiment of the present invention.

The same reference numerals as in FIGS. 1, 7, and 13 denote the same parts in FIG. 22, and a detailed description thereof will be omitted.

Referring to FIG. 22, a television signal used in this embodiment complies with the NTSC scheme. An A/D converter 11 samples an NTSC television signal input from an input terminal at a sampling frequency which is four times a subcarrier frequency $f_{SC}$ to produce a digital television signal (8 bits/sample). The digital television signals sequentially output from the A/D converter 11 are rearranged by a blocking circuit 12 in units of horizontal scanning lines. Each signal series is applied to a minimum value detector 14, a maximum value detector 16, an intrablock mean value detector 18, and a delay circuit 204. A subtracter 263 calculates a difference between a maximum value MAX detected by the maximum value detector 16 and a minimum value MIN detected by the minimum value detector 14. An output MIN from the minimum value detector 14, An output DR (=MAX−MIN) from the subtracter 263, An output MAX from the maximum value detector 16, and an output $m_0$ from the mean value detector 18 are applied to a converter (CONVERSION) 326 through delay circuits 264, 265, 266, and 267.

The converter 326 also receives the sample value DT formed by the A/D converter 11 and delayed by the delay circuit 204. The difference DR is quantized on the basis of the data MAX, MIN, DR, and $m_0$, and an index ID representing a correspondence of the difference DT and a given quantization step is output. This operation will be described in detail later. It should be noted that the delay circuits 264, 265, 266, and 267 are used to adjusting timings of the sample value applied from the delay circuit 204 to the converter 326.

In this embodiment, the following method is employed as a method of encoding a digital television signal. In a first operating mode, the dynamic range DR of the sample values DT of one block is divided into eight areas as shown in FIG. 23(a). A 3-bit index $ID_1$ representing the correspondence between each sample value DT and a divided area of the dynamic range, and 8-bit data as the MAX and MIN data representing the dynamic range of each block are formed, and the data MAX, MIN, and $ID_1$ are output in place of the sample value DT. In a second operating mode, the dynamic range DR is divided into four regions at equal intervals, as shown in FIG. 23(b). A 3-bit index $ID_2$ representing a correspondence between each sample value DT and a divided area of the dynamic range, and 8-bit MAX data as information representing the dynamic range of each block, and 4-bit MIN and $m_0$ data are formed. The data MAX, MIN, $m_0$, and $ID_2$ are output in place of the sample value DT. The first and second operating modes are adaptively switched in accordance with the dynamic range DR.

An identifier generator (IDENTIFIER GENERATION) 327 receives the dynamic range DR and outputs an identifier for identifying the operating mode. More specifically, the data DR is compared with an operating mode selection threshold. If the data DR is smaller than the threshold value, an identifier $MD_1$ for designating the first operating mode is output. Otherwise, an identifier $MD_2$ for designating the second operating mode is output.

Converters (CONVERSION) 328 and 329 and a parallel/serial converter 330 are circuits operated upon selection of the second operating mode. More specifically, the converter 328 converts 8-bit MIN data into 4-bit MIN' data. The converter 329 converts 8-bit $m_0$ data into 4-bit $m_0$' data The above conversion is performed using a memory table for outputting 4-bit data corresponding to the 8-bit input data. The parallel/serial converter 329 converts 4-bit signals from the converters 328 and 329 into a serial signal, i.e., an 8-bit signal. A selection circuit 331 selects the 8-bit MIN data from the delay circuit 264 in the first operating mode. However, in the second operating mode, the selection circuit 331 selects the 8-bit signal from the parallel/serial converter 330.

The MAX data from the delay circuit 264, the identifier data MD from the identifier generator 327, an output from the selection circuit 331, and the index ID from the converter 326 are applied to a data series formation circuit 332. The data series formation circuit 332 converts these input signals into a serial data series and outputs it. FIG. 24(a) shows an output data series in the first operating mode, and FIG. 24(b) shows an output data series in the second operating mode. In either operating mode, the lengths of the data series output from the data series formation circuit 332 are equal to each other and are given as a fixed length. When output data series is transmitted, recorded, or reproduced, its signal processing can be easily performed by a simple arrangement. In particular, special reproduction in recording-/reproduction can be easily performed.

FIG. 25 is a detailed diagram of the converter 326. The input signals MIN, MAX, and DT are applied to conversion elements (CONVERSION) 333 and 334, and the mean value $m_0$ is applied to the conversion element (CONVERSION) 334. Outputs from the conversion elements 333 and 334 and the dynamic range DR are applied to an output selecting circuit 335. The conversion element 333 performs encoding in the first operating mode, and the conversion element 334 performs encoding in the second operating mode. The conversion elements 333 and 334 output 3-bit indices $ID_1$ and $ID_2$, respectively. The output selecting circuit 335 selects one of the outputs from the conversion elements 333 and 334 in accordance with the dynamic range DR under the same condition as in generation of the identifier in the identifier generator 327.

The conversion element 333 shown in FIG. 25 has the same arrangement as that of the encoding element 272 shown in FIG. 16. In this embodiment, the comparators 291 to 297 shown in FIG. 16 output the comparison results C1 to C7 to the priority encoder 299 in accordance with the output DT' from the subtracter 298.

The outputs C1 to C7 are determined by the following conditions:

(1) If $0 \leq DT' < (1/8)DR$, $C1=C2=C3=C4=C5=C6=C7=0$ (2) If $(1/8)DR \leq DT' < (2/8)DR$, $C1=1$, $C2=C3=C4=C5=C6=C7=0$ (3) If $(2/8)DR \leq DT' < (3/8)DR$, $C1=C2=1$, $C3=C4=C5=C6=C7=0$ (4) If $(3/8)DR \leq DT' < (4/8)DR$, $C1=C2=C3=1$, $C4=C5=C6=C7=0$ (5) If $(4/8)DR \leq DT' < (5/8)DR$, $C1=C2=C3=C4=1$, $C5=C6=C7=0$ (6) If $(5/8)DR \leq DT' < (6/8)DR$, $C1=C2=C3=C4=C5=1$, $C6=C7=0$ (7) If $(6/8)DR \leq DT' < (7/8)DR$, $C1=C2=C3=C4=C5=C6=1$, $C7=0$ (8) If $(7/8)DR \leq DT' < DR$, $C1=C2=C3=C4=C5=C6=C7=1$ Conditions (1), (2), (3), (4), (5), (6), (7), and (8) correspond to areas $A_1$, $A_2$, $A_3$, $A_4$, $A_5$, $A_6$, $A_7$, and $A_8$ shown in FIG. 23(a), respectively. The priority encoder 299 outputs each 3-bit index $ID_1$, i.e., (000) for condition (1), (001) for condition (2), (010) for condition (3), (011) for condition (4), (100) for condition (5), (101) for condition (6), (110) for condition (7), and (111) for condition (8) to the output selecting circuit 335 shown in FIG. 25.

The conversion element 333 shown in FIG. 25 has the same arrangement as the encoding element 24 in FIG. 2. In this embodiment, the comparators 110 to 123 shown in FIG. 2 output the comparison results C1 to C7 to the encoder 124 in accordance with the output DT' from the subtracter 100. The outputs C1 to C7 are determined by the following conditions.

(1) If $0 \leq DT' < (1/4)(m_0 - MIN)$, $C1 = C2 = C3 = C4 = C5 = C6 = C7 = 0$
(2) If $(1/4)(m_0 - MIN) \leq DT' < (2/4)(m_0 - MIN)$, $C1 = 1$, $C2 = C3 = C4 = C5 = C6 = C7 = 0$
(3) If $(2/4)(m_0 - MIN) \leq DT' < (3/4)(m_0 - MIN)$, $C1 = C2 = 1$, $C3 = C4 = C5 = C6 = C7 = 0$
(4) If $(3/4)(m_0 - MIN) \leq DT' < (m_0 - MIN)$, $C1 = C2 = C3 = 1$, $C4 = C5 = C6 = C7 = 0$
(5) If $(m_0 - MIN) \leq DT' < (1/4)(MAX - m_0) + (m_0 - MIN)$, $c1 = C2 = C3 = C4 = 1$, $C5 = C6 = C7 = 0$
(6) If $(1/4)(MAX - m_0) + (m_0 - MIN) \leq DT' < (2/4)(MAX - m_0) + (m_0 - MIN)$, $C1 = C2 = C3 = C4 = C5 = 1$, $C6 = C7 = 0$
(7) If $(2/4)(MAX - m_0) + (m_0 - MIN) \leq DT'(3/4)(MAX - m_0) + (m_0 - MIN)$, $C1 = C2 = C3 = C4 = C5 = C6 = 1$, $C7 = 0$
(8) If $(3/4)(MAX - m_0) + (m_0 - MIN) \leq DT' < (MAX - MIN)$, $C1 = C2 = C3 = C4 = C5 = C6 = C7 = 1$ Conditions (1), (2), (3), (4), (5), (6), (7), and (8) correspond to areas $B_1$, $B_2$, $B_3$, $B_4$, $B_5$, $B_6$, $B_7$, and $B_8$ shown in FIGS. 23(b), respectively. The priority encoder 124 outputs a 3-bit index $ID_2$ in the same manner as in the conversion element 334 to the output selecting circuit 335 in FIG. 25.

Figure 26:
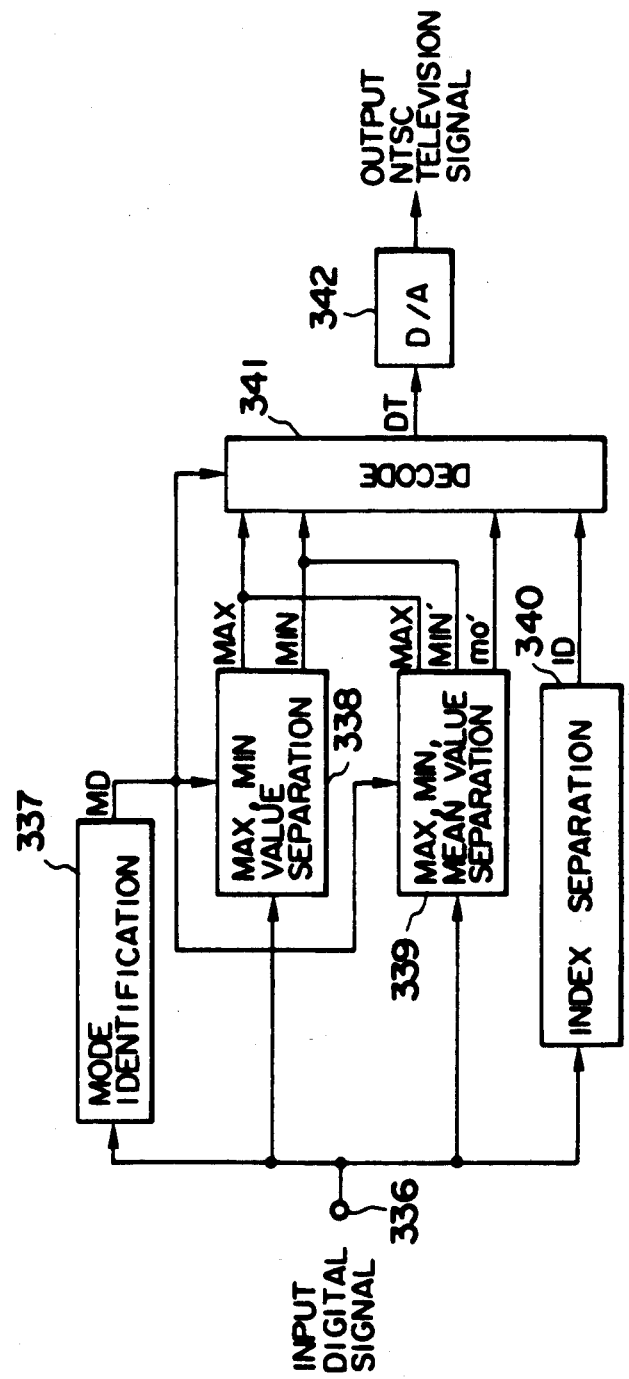
FIG. 26 is a schematic view showing a decoding apparatus corresponding to the encoding apparatus shown in FIG. 22.

FIG. 26 is a schematic diagram of a digital television signal decoding apparatus corresponding to the encoding apparatus of FIG. 22. A digital television signal input from a transmission line (not shown) is applied to a mode identification circuit 337, a MAX/MIN separation circuit 338, a MAX/MIN/mean value separation circuit 339, and an index separation circuit 340. The mode identification circuit 337 separates a mode identifier MD. The MAX/MIN separation circuit 338 separates and outputs maximum and minimum values MAX and MIN when the identifier MD from the mode identification circuit 337 represents $MD_1$ (first operating mode). The MAX/MIN/mean value separation circuit 339 separates and outputs the maximum value, the 4-bit minimum value MIN', and the 4-bit mean value $m_0'$ when the identifier MD from the mode identification circuit 337 represents $MD_2$ (second operating mode). The index separation circuit 340 separates and outputs an index portion. Since the data series supplied to each separation circuit has a fixed length, data separation operations can be easily performed. A clock generator (not shown) is arranged to separate the above data.

Figure 27:
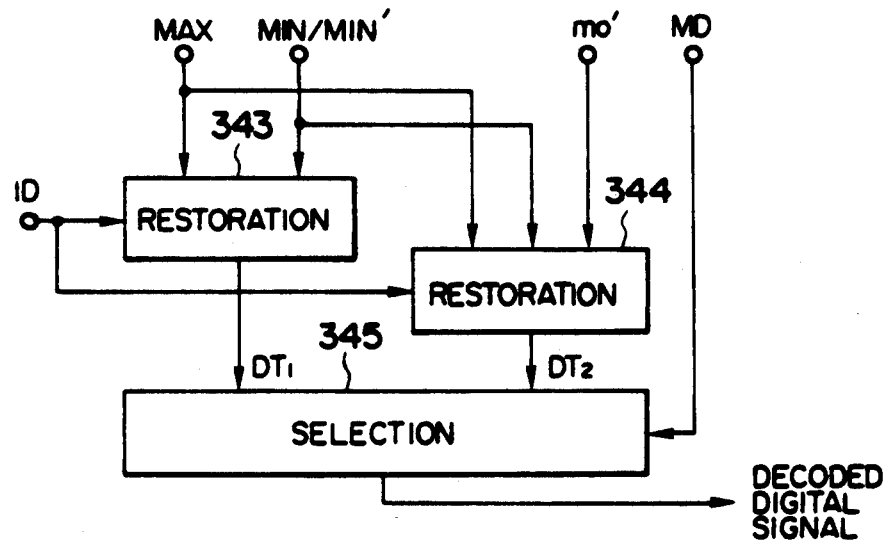
FIG. 27 is a detailed view showing a decoding circuit 341 in FIG. 26.

A decoding circuit (DECODE) 341 decodes the sample value DT from the data separated by the separation circuits 337, 338, 339, and 340, and the sample value DT is supplied to a D/A converter 342. The D/A converter 342 converts the decoded sample value DT into an analog signal in response to a sync signal having a sampling frequency of $4f_{SC}$, thereby restoring and outputting the NTSC television signal. A detailed arrangement of the decoding circuit 341 is shown in FIG. 27. A restoration circuit 343 restores each sample value from the index $ID_1$ in the first operating mode. A restoration circuit 344 restores an encoded signal for restoring each sample value from the index $ID_2$ in the second operating mode. A selection circuit 345 selects an output $DT_1$ from the restoration circuit 343 or an output $DT_2$ from the restoration circuit 344 in accordance with the mode identifier MD.

Figure 28:
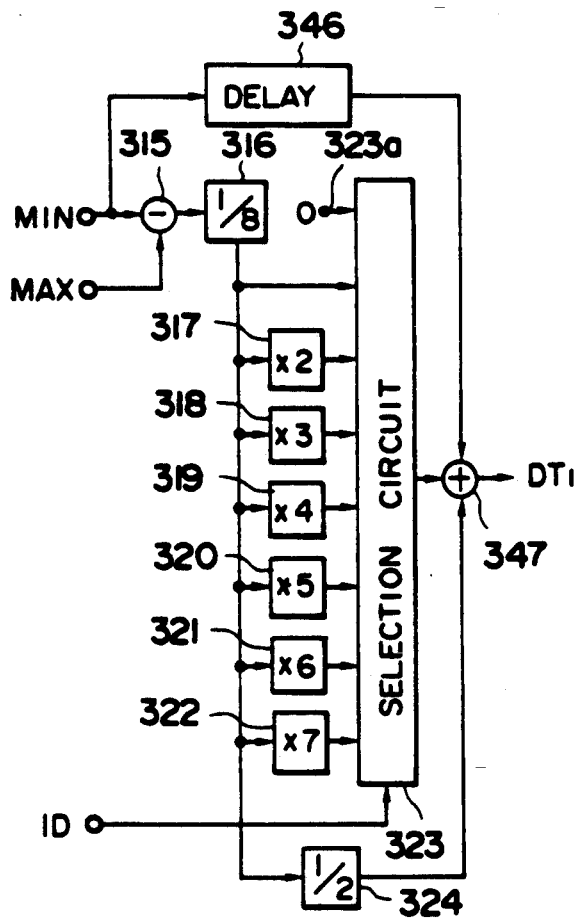
FIG. 28 is a detailed view showing a restoration circuit 343 in FIG. 27.

FIG. 28 is a diagram showing an arrangement of the restoration circuit 343 in FIG. 27. The same reference numerals as in the decoding element 311 of FIG. 21 denote the same parts in FIG. 28, and a detailed description thereof will be omitted.

As shown in FIG. 28, an adder 347 adds an output from a selection circuit 323 to an output from a divider 324. The adder 347 further adds the MIN data from the delay circuit 346 to the above sum. The delay circuit 346 is arranged to adjust timings. An output from the adder 347 is supplied as a restored sample value $DT_1$ to the selection circuit 345 of FIG. 27.

Figure 29:
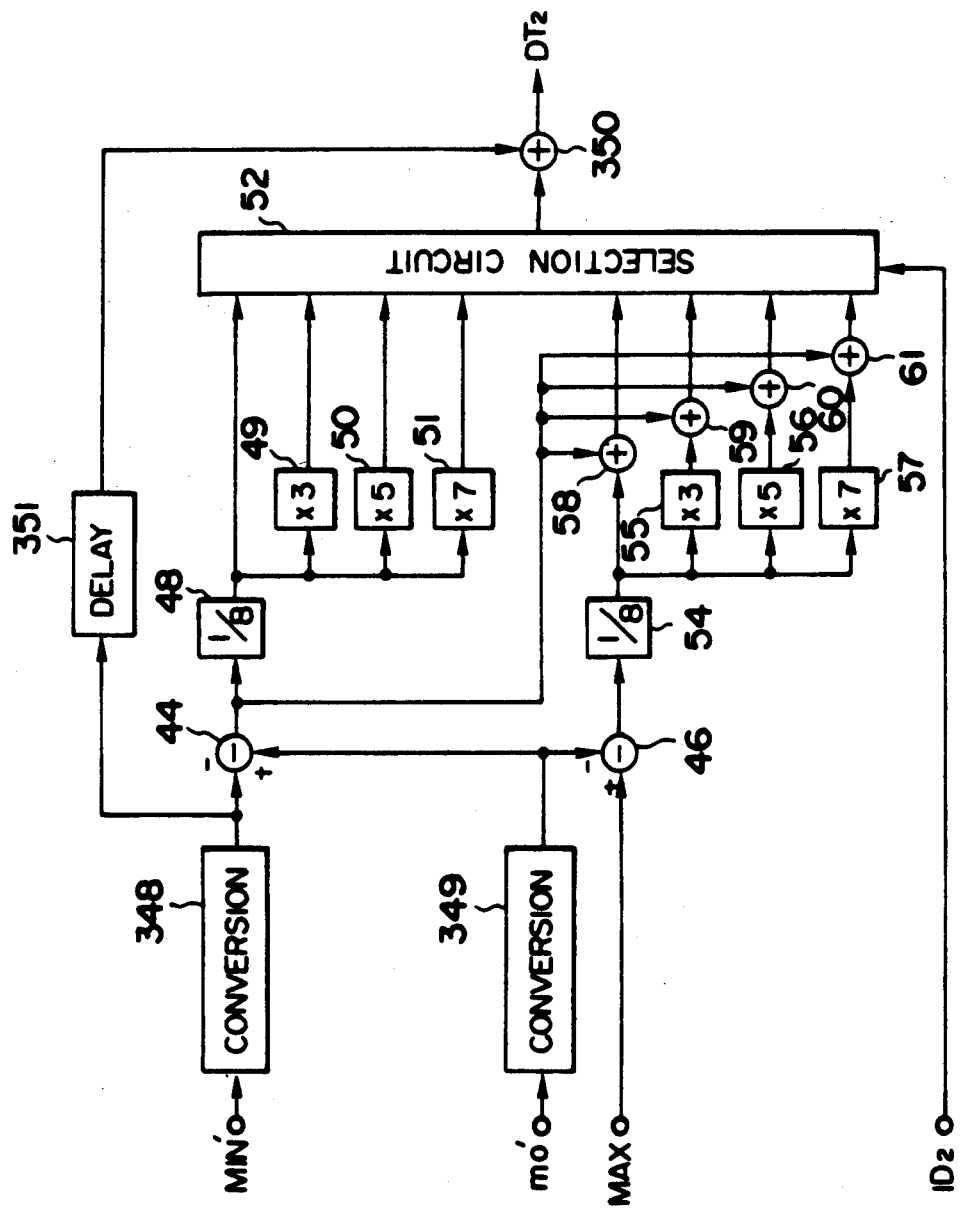
FIG. 29 is a detailed view showing a restoration circuit 344 in FIG. 27.

FIG. 29 is a diagram showing an arrangement of the restoration circuit 344 in FIG. 27. The same reference numerals as in the decoder 34 of FIG. 6 denote the same parts in FIG. 29, and a detailed description thereof will be omitted.

Referring to FIG. 29, a converter (CONVERSION) 348 comprises a memory table or the like and converts the 4-bit MIN' data into 8-bit MIN data. The converted data is supplied to a subtracter 44 and a delay circuit 351 (to be described later). A converter 349 comprises a memory table or the like and converts 4-bit $m_0'$ data into 8-bit $m_0$ data which is then supplied to subtracters 44 and 46.

In this embodiment, an output from the selection circuit 52 is applied to an adder 350. The data MIN is applied to the adder 350 through a delay circuit 351. A sum signal is supplied as a restored sample value $DT_2$ to the selection circuit 345 in FIG. 27.

According to this embodiment as described above, a television signal as a kind of image information is selectively encoded in the two operating modes. Even if a volume of information is small, encoding and transmission can be performed with minimum image quality degradation. When the television signal is selectively encoded in the two operating modes, the unit code length of the resultant data series is kept unchanged regardless of different operating modes. In addition, even if data series obtained in the two operating modes are mixed, the operating mode for the transmitted data series can be accurately discriminated, and the transmitted data series can be accurately decoded to the original signal.

The present invention is exemplified by encoding and transmission of the NTSC television signal. However, the present invention is not limited to this. The present invention is also applicable to an encoding/transmitting apparatus of a PAL or SECAM scheme, and an apparatus for transmitting an image signal except for the television signal, e.g., a facsimile signal to obtain the same effects as in the present invention.

What is claimed is:
1. An image information transmission apparatus for encoding an image information signal and transmitting an encoded image information signal, said information transmission apparatus comprising:
   (A) blocking means for receiving an image information signal of one frame consisting of a plurality of pixel data and for dividing the image information signal into a plurality of blocks each consisting of a predetermined number of pixel data;
   (B) first data forming means for forming at least two reference value data associated with a dynamic range of levels of the pixel data constituting each of the blocks divided by said blocking means;

(C) second data forming means for forming distribution state data associated with a distribution state of the levels of the pixel data constituting each of the blocks divided by said blocking means;

(D) encoding means for encoding the pixel data constituting each block to form encoded data on the basis of the refernece value data formed by said first data forming means and the distribution state data formed by said second data forming means; and (E) transmission data series forming means for forming a transmission data series by using the reference value data formed by said first data forming means, the distribution state data formed by said second data forming means, and the encoded data encoded by said encoding means as transmission units.

2. An apparatus according to claim 1, wherein said first data forming means includes:
   (A) maximum value data forming means for detecting a maximum value of the levels of the pixel data constituting each of the blocks divided by said blocking means, and for outputting maximum value data; and
   (B) minimum value data forming means for detecting a minimum value of the levels of the pixel data constituting each of the blocks divided by said blocking means, and for outputting minimum value data.

3. An image information transmission apparatus for encoding an image information signal and transmitting an encoded image information signal, said image transmission apparatus comprising:
   (A) blocking means for receiving an image information signal of one frame consisting of a plurality of pixel data and for dividing the image information signal into a plurality of blocks each consisting of a predetermined number of pixel data;
   (B) first data forming means for forming at least two reference value data associated with a dynamic range of levels of the pixel data constituting each of the blocks divided by said blocking means, wherein said first data forming means includes:
       (a) maximum value data forming for detecting a maximum value of the levels of the pixel data constituting each of the blocks divided by said blocking means, and for outputting maximum value data, and
       (b) minimum value data forming means for detecting a minimum value of the levels of the pixel data constituting each of the blocks divided by said blocking means, and for outputting minimum value data;
   (C) second data forming means for forming distribution state data associated with a distribution state of levels of the pixel data constituting each of the blocks divided by said blocking means, wherein said second data forming means includes mean value data forming means for calculating a mean value of the level of the pixel data constituting each of the blocks divided by said blocking means, and for outputting mean value data;
   (D) encoding means for encoding the pixel data constituting each block to form encoded data on the basis of the reference value data formed by said first data forming means and the distribution state data formed by said second data forming means; and
   (E) transmission data series forming means for forming a transmission data series by using the reference value data formed by said first data forming means, the distribution state data formed by said second data forming means, and the encoded data encoded by said encoding means as transmission units.

4. An apparatus according to claim 3, wherein said second data forming means further includes:
   first subdata calculating means for calculating a mean value of the pixel data having levels falling between the maximum value and the mean value by using the maximum value data output from said maximum data forming means, the minimum value data output from said minimum value data forming means, and the mean value data output from said mean value data forming means, and for outputting the calculated mean value as first subdata; and
   second subdata calculating means for calculating a mean value of the pixel data having levels falling between the minimum value and the mean value, and for outputting the calculated mean value as second subdata.

5. An apparatus according to claim 3, wherein said encoding means includes:
   (A) first quantization level setting means for quantizing the levels falling between the maximum value detected by said maximum value data forming means and the mean value calculated by said mean value data forming means, and for setting a plurality of different quantization levels;
   (B) second quantization level setting means for quantizing the levels falling between the minimum value detected by said minimum value data forming means and the mean value calculated by said mean value data forming means, and for setting a plurality of different quantization levels; and
   (C) comparing means for comparing the levels of the pixel data within each block and the plurality of different quantization levels set by said first and second quantization level setting means, and for outputting encoded data representing a correspondence between the pixel data and one of the quantization levels.

6. An apparatus according to claim 4, wherein said encoding means includes:
   (A) first quantization level setting means for quantizing the levels falling between the maximum value detected by said maximum value data forming means and the value of the first subdata calculated by said first subdata calculating means, and for setting a plurality of different quantization levels;
   (B) second quantization level setting means for quantizing the levels falling between the value of the first subdata calculated by said first subdata calculating means and the mean value calculated by said mean value data forming means, and for setting a plurality of different quantization levels;
   (C) third quantization level setting means for quantizing the levels falling between the mean value calculated by said mean value data calculating means and the value of the second subdata calculated by said second subdata calculating means, and for setting a plurality of different quantization levels;
   (D) fourth quantization level setting means for quantizing the levels falling within the value of the second subdata calculated by said second subdata calculating means and the minimum value detected by said minimum value data forming means, and for setting a plurality of different quantization levels; and (E) comparing means for comparing the levels of the pixel data within each block and the plurality of different quantization levels set by the first, second, third, and fourth quantization level setting means, and for outputting coded data representing a correspondence between each pixel data and one of the plurality of quantization levels.

7. An apparatus according to claim 1, wherein said first data forming means includes:

(A) maximum value data forming means for detecting a maximum value of the levels of the pixel data constituting each of the blocks divided by said blocking means, and outputting maximum value data; and (B) dynamic range data forming means for detecting a dynamic range of the pixel data constituting each of the blocks divided by said blocking means, and outputting dynamic range data.

8. An apparatus according to claim 1, wherein said first data forming means includes:

(A) minimum value data forming means for detecting a minimum value of the levels of the pixel data constituting each of the blocks divided by said blocking means, and outputting minimum value data; and (B) dynamic range data forming means for detecting a dynamic range of the pixel data constituting each of the blocks divided by said blocking means, and outputting dynamic range data.

9. An image information transmission apparatus for encoding and transmitting an image information signal, said image information transmission apparatus comprising:

(A) blocking means for receiving an image information signal of one frame consisting of a plurality of pixel data, and for dividing the image information signal into a plurality of blocks each consisting of a predetermined number of pixel data;

(B) first data forming means for forming at least two reference value data associated with a dynamic range of levels of pixel data constituting each of the blocks divided by said blocking means;

(C) second data forming means for forming a distribution state data associated with a distribution state of the levels of the pixel data constituting each of the blocks divided by said blocking means;

(D) encoding means having a first encoding mode for encoding the pixel data constituting each block on the basis of the reference value data formed by said first data forming means and a second encoding mode for encoding the pixel data constituting each block on the basis of the reference value data formed by said first data forming means and the distribution state data formed by said second data forming means, said encoding means being adapted to form encoded data by encoding the pixel data within each block by using one of the first and second encoding modes in accordance with the dynamic range of levels of the pixel data constituting each block; and (E) transmission data series forming means for forming a transmission data series by using the reference value data formed by said first data forming means and the data encoded by said encoding means as transmission units when the pixel data is encoded by said encoding means in the first encoding mode, and for forming a transmission data series by using the reference value data formed by said first data forming means, the distribution state data formed by said second data forming means, and the data encoded by said encoding means as transmission units when the pixel data is encoded by said encoding means in the second encoding mode.

10. An apparatus according to claim 9, wherein said second data forming means includes mean value data forming means for calculating a mean value of the levels of the pixel data constituting each of the blocks divided by said blocking means, and for outputting mean value data.

11. An apparatus according to claim 10, wherein said second data forming means includes:

first subdata calculating means for calculating a mean value of the pixel data having the levels falling between the maximum value of the levels of the pixel data within each block and the calculated mean value by using the reference value data output from said first data forming means and the mean value data output from said mean value data forming means, and for outputting the calculated mean value as first subdata; and second subdata calculating means for calculating a mean value of the pixel data having the levels falling between the minimum value of the levels of the pixel data within each block and the calculated mean value, and for outputting the calculated mean value as second subdata.

12. An apparatus according to claim 10, wherein said encoding means includes:

(A) first quantization level setting means for quantizing the dynamic range represented by the reference value data formed by said first data forming means, and for setting a plurality of different quantization levels;

(B) second quantization level setting means for quantizing the levels between the maximum value represented by the reference value data formed by said first data forming means and the mean value calculated by said mean value data forming means, and for setting a plurality of different quantization levels;

(C) third quantization level setting means for quantizing the levels between the minimum value represented by the reference value data formed by said first data forming means and the mean value calculated by said mean value data forming means, and for setting a plurality of different quantization levels;

(D) first comparing means for comparing the level of each pixel data within each block with the plurality of different quantization levels set in said first quantization level setting means, and for outputting encoded data representing a correspondence between each pixel data and one of the plurality of different quantization levels;

(E) second comparing means for comparing the level of each pixel data within each block with the plurality of different quantization levels set by said second and third quantization levels, and for outputting encoded data representing a correspondence between each pixel data and one of the plurality of different quantization levels; and (F) selecting/outputting means for selectively outputting one of the encoded data output from said first comparing means and the encoded data output from said second comparing means in accordance with the dynamic range of the levels of the pixels within each block which is represented by the reference value data formed by said first data forming means.

13. An apparatus according to claim 11, wherein said encoding means includes:
(A) first quantization level setting means for quantizing the dynamic range represented by the reference value data formed by said first data forming means, and for setting a plurality of different quantization levels;
(B) second quantization level setting means for quantizing the levels falling between the maximum value represented by the reference value data formed by said first data forming means and the mean value calculated by said mean value data forming means, and for setting a plurality of different quantization levels;
(C) third quantization level setting means for quantizing the levels falling between the minimum value represented by the reference value data formed by said first data forming means and the mean value calculated by said mean value data forming means, and for setting a plurality of different quantization levels;
(D) fourth quantization level setting means for quantizing the levels falling between the maximum value represented by the reference value data formed by said first data forming means and the value of the first subdata calculated by said first subdata calculating means, and for setting a plurality of different quantization levels;
(E) fifth quantization level setting means for quantizing the levels falling between the value of the first subdata calculated by said first subdata calculating means and the mean value calculated by said mean value data forming means, and for setting a plurality of different quantization levels;
(F) sixth quantization level setting means for quantizing the levels falling between the mean value calculated by said mean value data calculating means and the value of the second subdata calculated by said second subdata calculating means, and for setting a plurality of different quantization levels;
(G) seventh quantization level setting means for quantizing the levels falling between the value of the second subdata calculated by said second subdata calculating means and the minimum value represented by the reference value data formed by said first data forming means, and for setting a plurality of different quantization levels;
(H) first comparing means for comparing the level of each pixel data within each block with the plurality of different quantization levels set by said first quantization level setting means, and for outputting encoded data representing a correspondence between each pixel data and one of the plurality of different quantization levels;
(I) second comparing means for comparing the level of each pixel data within each block with the plurality of different quantization levels set by said second and third quantization level setting means, and for outputting encoded data representing a correspondence between each pixel data and one of the plurality of different quantization levels;
(J) third comparing means for comparing the level of each pixel data within each block with the plurality of different quantization levels set by said fourth, fifth, sixth, and seventh quantization level setting means, and for outputting coded data representing a correspondence between each pixel and one of the plurality of different quantization levels; and
(K) selecting/outputting means for one of the encoded data output from said first comparing means, the encoded data output from said second comparing means, and the encoded data output from said third comparing means in accordance with the dynamic range of the levels of the pixel data within each block which is represented by the reference value data formed by said first data forming means.

14. An apparatus according to claim 9, further comprising encoding identification data generating means for generating first or second encoding designation data for identifying that the pixel data is encoded said encoding means in the first or second encoding mode.

15. An apparatus according to claim 14, wherein said encoding identification data generating means is arranged to generate the first or second encoding mode designation data in accordance with the dynamic range of the levels of the pixel data within each block which is represented by the reference value data formed by said first data forming means.

16. An apparatus according to claim 14, wherein said transmission data series forming means is arranged to form the transmission data series by using the first encoding mode designation data output from said encoding identification data generating means, the reference value data output from said first data forming means, and the encoded data output from said encoding means as transmission units when the pixel data is encoded by said encoding means in the first encoding mode, and to form the transmission series by using the second encoding mode designation data output from said encoding identification data generating means, the reference value data output from said first data forming means, the distribution state data output from said second data forming means, and the encoded data output from said encoding means as transmission units when the pixel data is encoded by said encoding means in the second encoding mode.

17. An apparatus according to claim 14, wherein said transmission data series forming means includes data length converting means for converting part of the plurality of reference value data formed by said first data forming means and the distribution state data formed by said second data forming means into data having lengths smaller than original data lengths, and is arranged to form the transmission data series by using the first encoding mode designation data output from said encoding identification data generating means, the reference value data output from said first data generating means, and the encoded data output from said encoding means as transmission units when the pixel data is encoded by said encoding means in the first encoding mode, and to form a transmission data series having the same data lengths of the transmission units as in the first encoding mode by using as transmission units the second encoding mode designation data output from said encoding identification data generating means, the reference value data which are not converted by said data length converting means and selected from the plurality of reference value data formed by said first data forming means, the reference value data, the data length of which is converted by said data length converting means, the distribution state data, and encoded data formed by said encoding means when the pixel data is encoded by said encoding means in the second encoding mode.

18. An image information transmission apparatus for encoding an image information signal and transmitting an encoded image information signal, said image information transmission apparatus comprising:

(A) a transmission device including:
  (a) blocking means for receiving an image information signal of one frame consisting of a plurality of pixel data, and for dividing the image information signal into a plurality of blocks each consisting of a predetermined number of pixel data,
  (b) first data forming means for forming at least two reference value data associate with a dynamic range of levels of pixel data constituting each of the blocks divided by said blocking means,
  (c) second data forming means for forming distribution state data associated with a distribution state of the levels of the pixel data constituting each of the blocks divided by said blocking means,
  (d) encoding means for encoding the pixel data constituting each block on the basis of the reference value data formed by said first data forming means and the distribution state data formed by said second data forming means, and
  (e) transmission data series forming means for forming a transmission data series by using the reference value data formed by said first data forming means, the distribution state data formed by said second data forming means, and the encoded data formed by said encoding means as transmission units; and (B) a reception device including:
  (a) separating means for receiving the transmission data series output from said transmission data series forming means and separating the reference value data, level data, and encoded value data from the transmission data series, and
  (b) decoding means for decoding the encoded data separated by said separating means, on the basis of the reference value data and the distribution state data which are respectively separated by said separating means.

* * * * *

UNITED STATES PATENT AND TRADEMARK OFFICE
CERTIFICATE OF CORRECTION

PATENT NO. : 5,070,402
DATED : December 3, 1991
INVENTOR(S) : YOSHIKI ISHII, ET AL.

It is certified that error appears in the above-identified patent and that said Letters Patent is hereby corrected as shown below:

ON THE TITLE PAGE:

IN [75] INVENTORS

"Yokoham" should read --Yokohama-- and
"Hemamatsu" should read --Hamamatsu--.

IN [30] FOREIGN APPLICATION PRIORITY DATA

"62-267405" should read --62-297405--.

IN [56] REFERENCES CITED

Under U.S. PATENT DOCUMENTS, "Kendo" should read --Kondo--.

SHEET 13 OF 17

FIG. 22, "MINMUM" should read --MINIMUM--.

COLUMN 1

Line 17, "band with" should read --bandwidth--.
Line 31, "quantized" should read --quantized.--.

COLUMN 4

Line 20, "(MIN 14," should read --(MIN) 14,--
Line 21, "and" should be deleted.
Line 67, "$0 \leqq DT' < (\frac{1}{4})m_0 — MIN),$" should read
--$0 \leqq DT' < (\frac{1}{4})(m_0 — MIN),$--.

UNITED STATES PATENT AND TRADEMARK OFFICE
CERTIFICATE OF CORRECTION

PATENT NO. : 5,070,402
DATED : December 3, 1991
INVENTOR(S) : YOSHIKI ISHII, ET AL.

It is certified that error appears in the above-identified patent and that said Letters Patent is hereby corrected as shown below:

COLUMN 5

Line 1, "$\frac{1}{4}(m_0-MIN) \leq DT' < (2/4)(m_0-MIN),$" should read
--$(\frac{1}{4})(m_0-MIN) \leq DT' < (2/4)(m_0-MIN),$--.

Line 3, "$(2/4 \ (m_0-MIN) \leq DT' < (^3/_4)(m_0-MIN),$" should read
--$(2/4)(m_0-MIN) \leq DT' < (^3/_4)(m_0-MIN),$--.

Line 9, "$(\frac{1}{4})(MAX-m_0)+(m_0-MIN) < DT' < (2/4)$" should read
--$(\frac{1}{4})(MAX-m_0)+(m_0-MIN) \leq DT' < (2/4)$--.

Line 25, "MAX the mean value ," should read
--MAX, the mean value $m_0$, and--.

COLUMN 6

Line 38, "an" should read --and an--.
Line 40, "(COMPARISON 207" should read --(COMPARISON) 207--.
Line 43, "8." should read --18.--.
Line 56, "samples." should read --samples--.

COLUMN 7

Line 51, "$(\frac{1}{2})(m_1-MIN) \leq DR' < (m_1-MIN),$" should read
--$(\frac{1}{2})(m_1-MIN) \leq DT' < (m_1-MIN),$--.

COLUMN 13

Line 9, "An" should read --an--.
Line 10, "An" should read --an--.

COLUMN 15

Line 6, "The" should read --¶ The--.

UNITED STATES PATENT AND TRADEMARK OFFICE
CERTIFICATE OF CORRECTION

PATENT NO. : 5,070,402
DATED : December 3, 1991
INVENTOR(S) : YOSHIKI ISHII, ET AL.

It is certified that error appears in the above-identified patent and that said Letters Patent is hereby corrected as shown below:

COLUMN 17

Line 7, "refernece" should read --reference--.
Line 44, "forming" should read --forming means--.

COLUMN 18

Line 13, "data" should read --value data--.
Line 60, "calculating" should read --forming--.
Line 65, "within" should read --between--.

COLUMN 20

Line 54, "in" should read --by--.
Line 62, "levels," should read --level setting means,--.

COLUMN 21

Line 2, "pixels" should read --pixel data--.
Line 3, "block which is" should read --block, said dynamic range being--.

COLUMN 22

Line 6, "for" should read --for selectively outputting--.
Line 12, "block which is" should read --block, said dynamic range being--.
Line 16, "encoding" should read --encoding mode--.
Line 17, "encoded" should read --encoded by--.
Line 23, "block which" should read --block, said dynamic range being--.
Line 24, "is" should be deleted.
Line 54, "generat-" should read --form- --.

UNITED STATES PATENT AND TRADEMARK OFFICE
CERTIFICATE OF CORRECTION

PATENT NO.  : 5,070,402
DATED       : December 3, 1991
INVENTOR(S) : YOSHIKI ISHII, ET AL.

It is certified that error appears in the above-identified patent and that said Letters Patent is hereby corrected as shown below:

COLUMN 23

Line 15, "associate" should read --associated--.

COLUMN 24

Line 2, "block on" should read --block to form encoded data on--.
   Line 17, "level" should read --the distribution-- and "value" (second occurrence) should be deleted.

Signed and Sealed this

Sixth Day of July, 1993

Attest:

MICHAEL K. KIRK

*Attesting Officer*    *Acting Commissioner of Patents and Trademarks*